US00RE39136E

(19) United States
(12) Reissued Patent
Tharalson et al.

(10) Patent Number: US RE39,136 E
(45) Date of Reissued Patent: Jun. 20, 2006

(54) COMBINATION CO-SLEEPER AND CHANGING TABLE

(75) Inventors: Douglas Tharalson, Agoura, CA (US); Diana Tharalson, Agoura, CA (US); Bruce Martin, Malibu, CA (US)

(73) Assignee: Arms Reach, Inc., Malibu, CA (US)

(21) Appl. No.: 10/797,933

(22) Filed: Mar. 10, 2004

Related U.S. Patent Documents

Reissue of:
(64) Patent No.: 6,578,211
Issued: Jun. 17, 2003
Appl. No.: 09/838,041
Filed: Apr. 20, 2001

U.S. Applications:

(63) Continuation-in-part of application No. PCT/US00/14086, filed on May 22, 2000.

(51) Int. Cl.
*A47D 7/04* (2006.01)

(52) U.S. Cl. ..... 5/93.2; 5/95; 5/98.1; 5/655
(58) Field of Classification Search ..... 5/98.1, 5/95, 96, 93.1, 93.2, 99.1, 424, 426, 97, 655
See application file for complete search history.

(56) References Cited

U.S. PATENT DOCUMENTS 620,069 A * 2/1899 Cobb ..... 5/95
1,138,451 A * 5/1915 Bugele ..... 5/95
1,267,244 A * 5/1918 McMillan ..... 5/95
1,283,169 A * 10/1918 Hasson ..... 5/99.1
2,632,186 A * 3/1953 Berk et al. ..... 5/99.1
2,691,176 A * 10/1954 Saldana ..... 5/93.1
3,427,666 A * 2/1969 Saxe ..... 5/93.2
5,148,561 A * 9/1992 Tharalson et al. ..... 5/95
5,172,435 A * 12/1992 Griffin et al. ..... 5/95
5,293,655 A * 3/1994 VanWinkle et al. ..... 5/95
5,339,470 A * 8/1994 Shamie ..... 5/98.1
5,349,709 A * 9/1994 Cheng ..... 5/93.1
5,430,899 A * 7/1995 Chisholm ..... 5/95
5,548,005 A * 8/1996 Kurth et al. ..... 523/414
5,553,336 A * 9/1996 Mariol ..... 5/93.1
5,581,827 A * 12/1996 Fong et al. ..... 5/98.1
5,822,817 A * 10/1998 Carew et al. ..... 5/732
5,845,349 A * 12/1998 Tharalson et al. ..... 5/99.1
5,963,998 A * 10/1999 Carew et al. ..... 5/655
6,112,347 A * 9/2000 Tharalson et al. ..... 5/95
6,148,456 A * 11/2000 Tharalson et al. ..... 5/99.1

* cited by examiner

*Primary Examiner*—Frederick L. Lagman
(74) *Attorney, Agent, or Firm*—Reed Smith LLP

(57) ABSTRACT

A co-sleeper convertibly adapted for use as a changing table is described. The invention includes a collapsible rigid frame designed to support an enclosure at a predetermined height. The enclosure has padded walls and is sized and shaped to fit over the rigid frame. The back, first and second side walls of the enclosure are of a first height above a floor of the enclosure while the front wall is of a lower height. The floor of the enclosure is designed to be slightly lower that the top surface of a parental bed. A mattress pad is sized and shaped to fit within the enclosure and is segmented to use as a containing cover for the co-sleeper when the frame is collapsed. A strapping member is provided to hold the co-sleeper to the parental bed. A number of variations of this strapping member are provided. Several styles of support members for enclosure are provided. These include support bars that attach to the rigid frame, a series of hangers that support horizontal bars while hanging from top rails of the frame, and rigid panels and support rods fitted into pockets on the underside of the enclosure. Variants on the invention also include mesh panels for lower portions of the enclosure walls and rigid panels for insertion into pockets in the enclosure walls designed to prevent the formation of unwanted folds in the enclosure walls that could trap a child. The co-sleeper is height adjustable for variations in parental bed height.

53 Claims, 17 Drawing Sheets

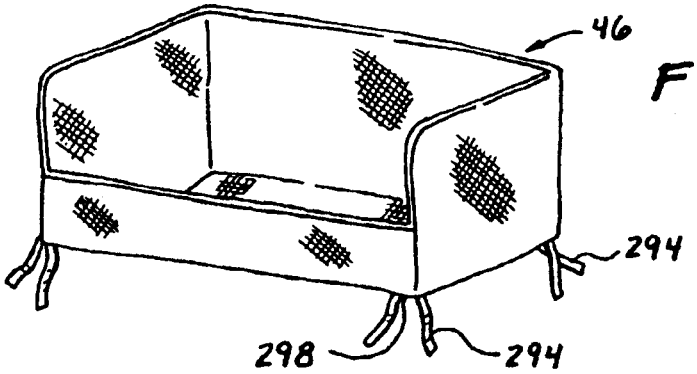
Fig. 5
Fig. 4
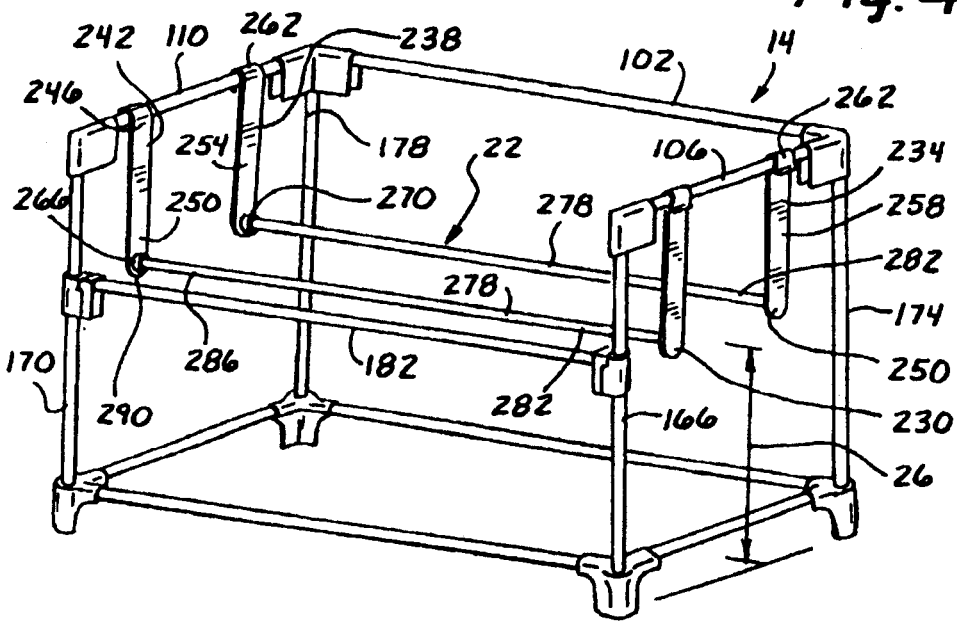
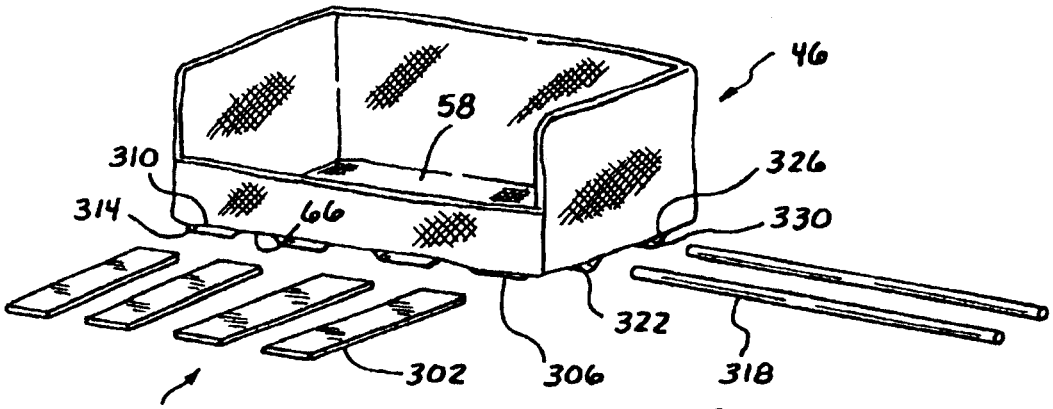
Fig. 6

Fig. 15
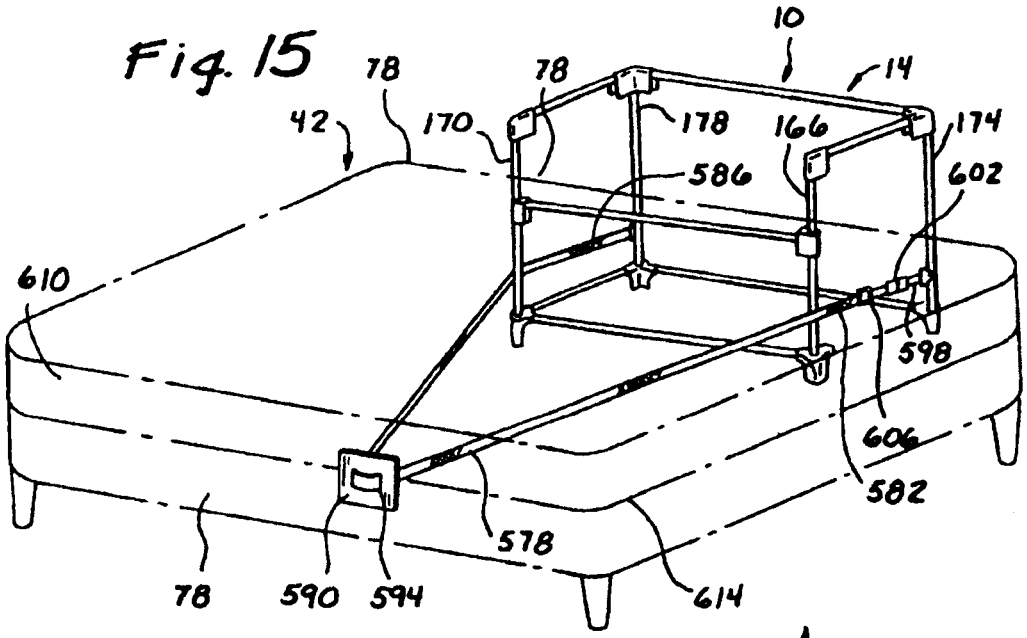
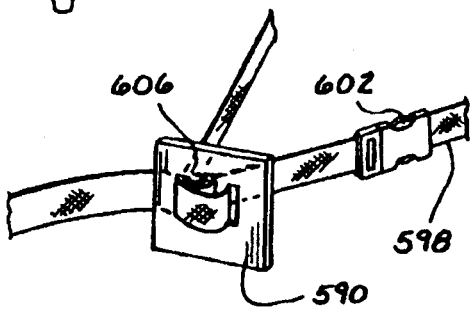
Fig. 15A
Fig. 16
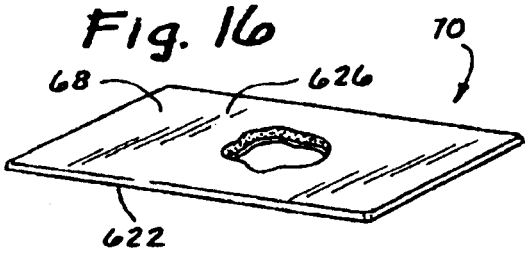
Fig. 17
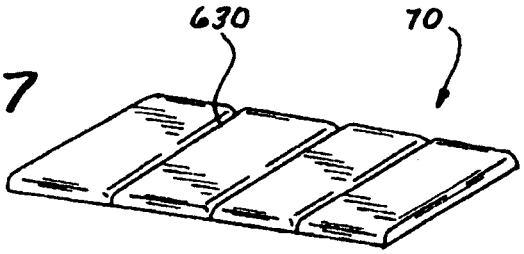

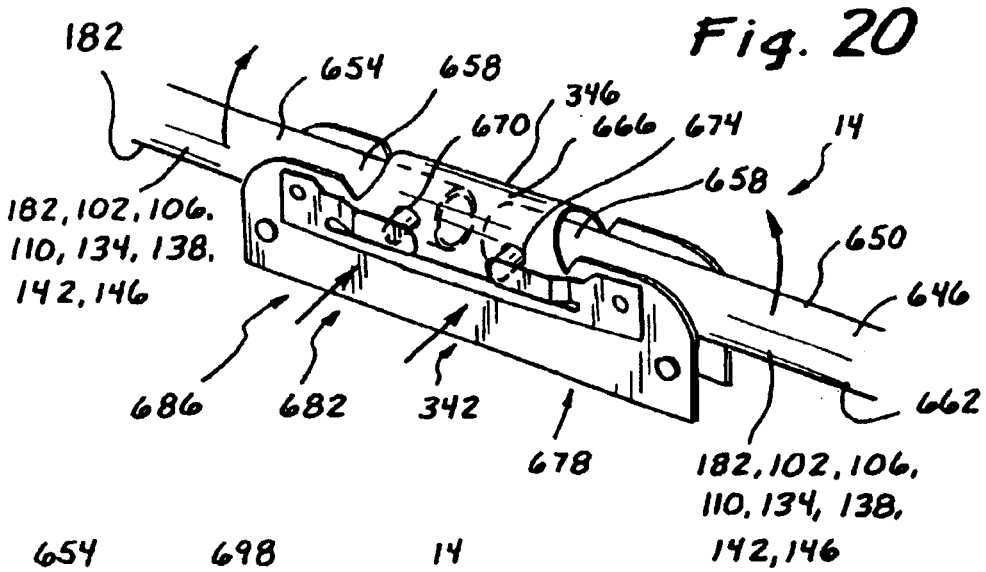
Fig. 20
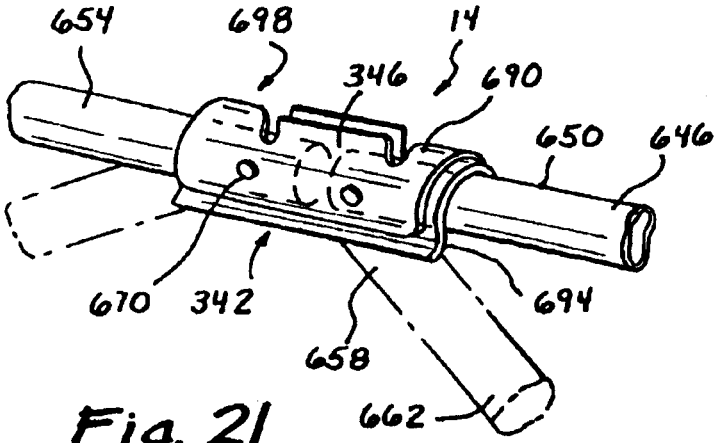
Fig. 21
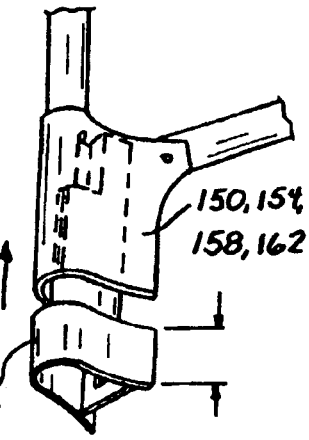
Fig. 23
Fig. 22
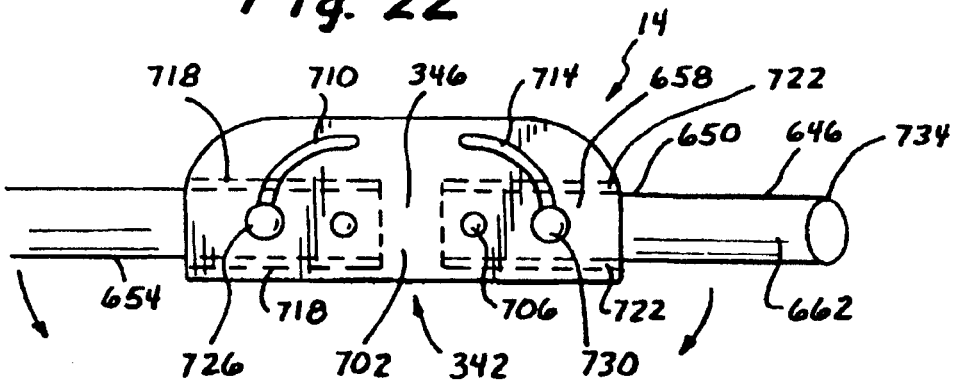

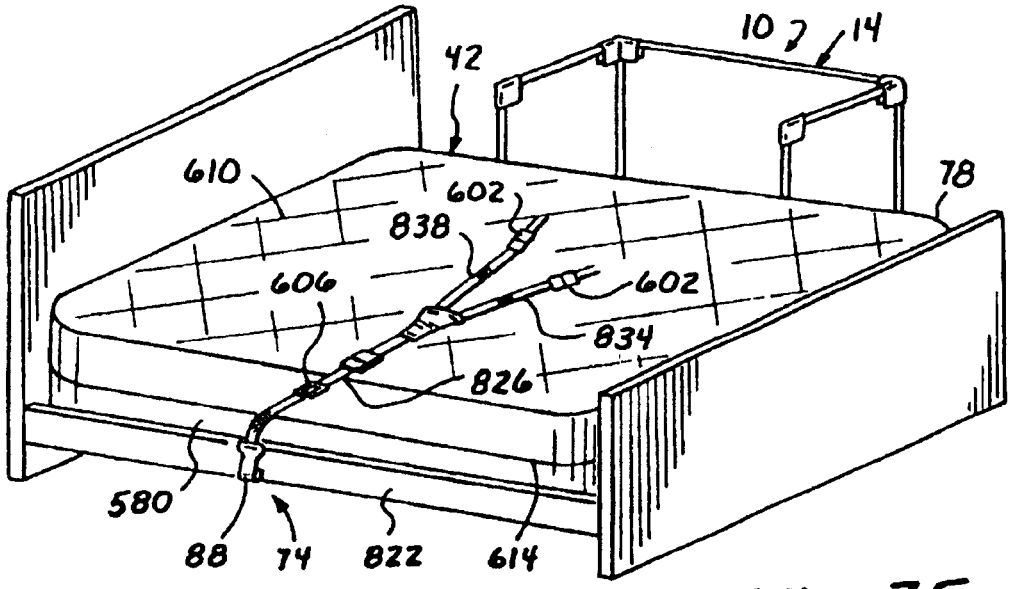
Fig. 35
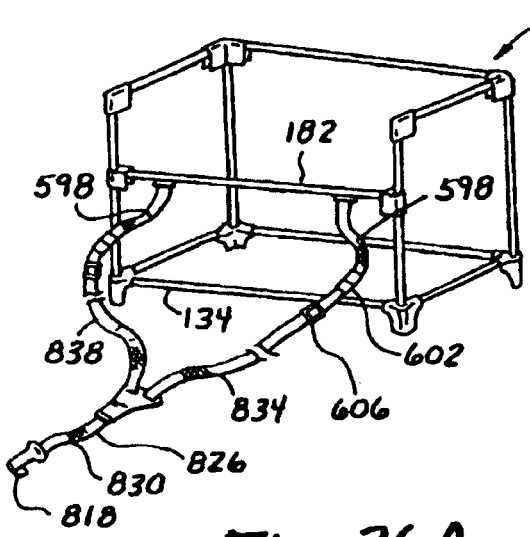
Fig. 36
Fig. 36A
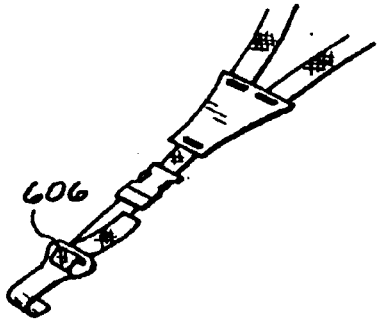
Fig. 37
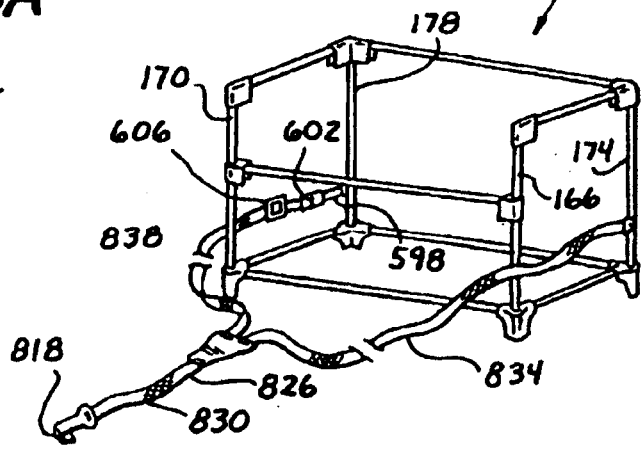

Fig. 38
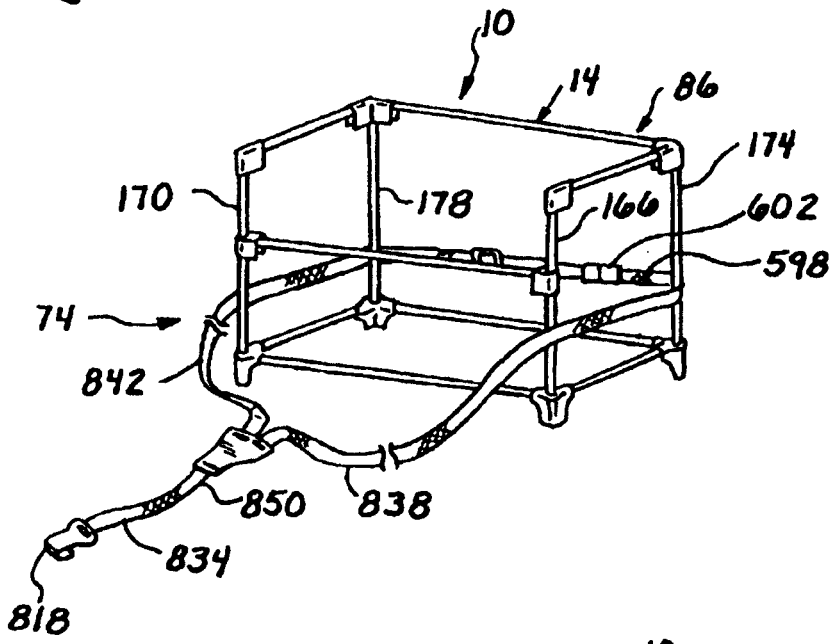
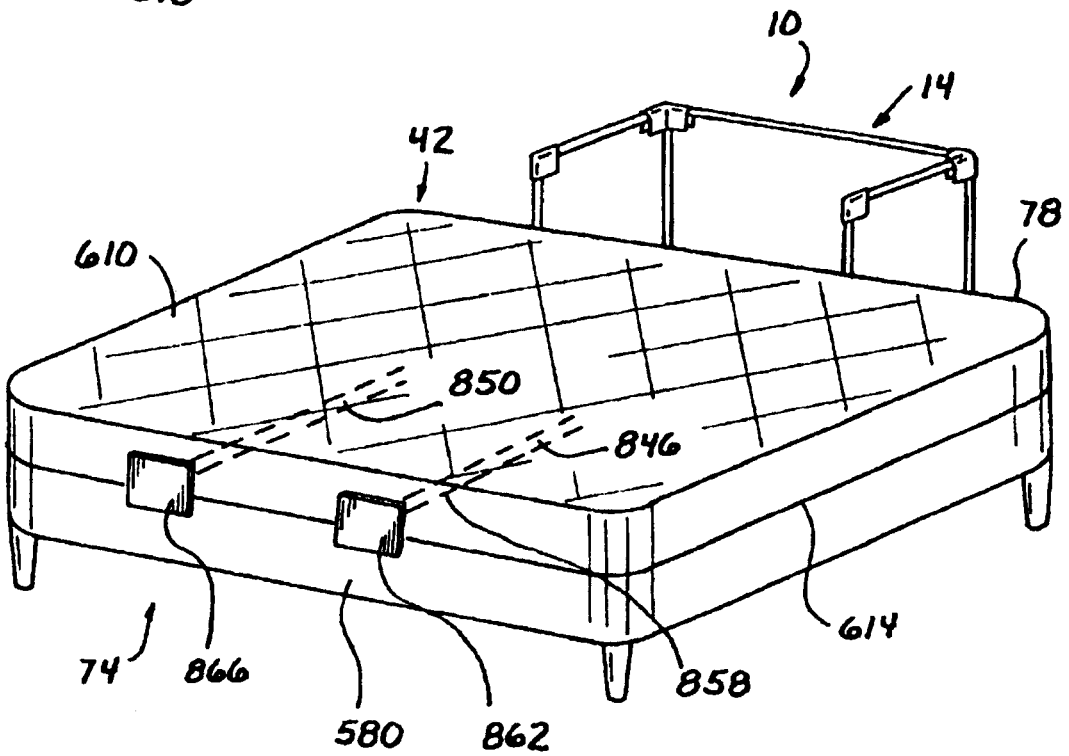
Fig. 39

COMBINATION CO-SLEEPER AND CHANGING TABLE

Matter enclosed in heavy brackets [ ] appears in the original patent but forms no part of this reissue specification; matter printed in italics indicates the additions made by reissue.

*This application is a continuation-in-part of International Application No. PCT/US00/14086, filed May 22, 2000 which was published under PCT Article 21 (2) in English as International Publication No. WO 01/80692.*

FIELD OF INVENTION

The instant invention relates to the field of convertible units for use with babies and very young children; in particular to units which may be easily converted to a changing table or child's bed-side sleeping enclosure, hereinafter referred to for convenience as a "co-sleeper", that attaches securely to the parents' bed.

BACKGROUND OF THE INVENTION

Furniture and fixtures for use by babies and small children often presents a problem for parents with limited living space. For this reason it is desirable that such furniture serve more than one purpose. A bedside co-sleeper is very useful for an infant or very young child as it prevents a parent from having to get out of bed to deal with a child requiring minor attention or comforting. If the co-sleeper can then be put to other uses, the parents will save both space and the cost of other furniture. Various examples of such multi-purpose children's furniture have been patented and sold.

In U.S. Pat. No. 5,349,709, issued to Cheng teaches a folding combination playpen and baby bed having an elevated floorboard. U.S. Pat. No. 5,339,470, issued to Shamie discloses a combination foldable playpen and dressing/changing table. U.S. Pat. No. 5,553,336 issued to Mariol adds an upper level to a playpen to provide a bassinet. The short legs of the upper level are inserted into openings in the top of the vertical supports of the playpen. U.S. Pat. No. 2,632,186, issued to Berk et al. discloses a portable combination crib and playpen. U.S. Pat. No. 2,691,176 issued to Saldana teaches a unit designed for home and travel that may be used as a support for a playpen, bassinet or baby chair.

Beside cribs that attached to the parents' bed were known at the turn of the century (U.S. Pat. Nos. 5,548,005; 620,069; 1,138,451; 1,283,169; 1,267,244) but fell out of favor for many years. Recently there has been a resurgence in the practice of having babies adjacent the parents' bed. Such bed-side devices are taught in U.S. Pat. No. 5,172,435 to Griffin et al.; U.S. Pat. No. 5,148,561 to Tharalson et al; and U.S. Pat. No. 5,293,655 to Van Winkle et al.

It is an objective of the present invention to provide a bedside co-sleeper that can be adapted for use as a changing table. It is a further objective of the invention to provide a stand-alone unit that is inexpensive, compact and portable. It is still a further objective of the present invention that the unit be simple to erect and collapsible for transport and storage. Finally, it is an objective of the invention that the co-sleeper design consider and address all possible safety considerations related to its use. Other features and advantages of the invention will be seen from the following description and drawings. The present invention addresses many of the deficiencies of prior art convertible sleeping unit inventions and satisfies all of the objectives described above.

SUMMARY OF THE INVENTION

A combination co-sleeper and changing table providing the desired features may be constructed from the following components. A rigid frame is provided. The frame provides means for attaching a support platform at a first predetermined height. The first predetermined height is less than a height of a top surface of a mattress of a parental bed. An enclosure is provided. The enclosure has an open top, a surrounding wall and a floor, the floor has an upper surface and a lower surface. The enclosure is sized and shaped to fit removably over the rigid frame with the lower surface of the floor located upon the support platform. A mattress pad is provided. The mattress pad is sized and shaped to fit slidably within the enclosure. Means are provided for removably attaching the rigid frame to a side of the parental bed.

In a variant of the invention, the rigid frame includes a front side element, a back side element, a first side element and a second side element. The rigid frame is formed at a top by a rear upper horizontal rail and first and second upper side parallel horizontal rails and two upper front corner members and two upper rear corner members in cooperation with the rails. The rigid frame is formed adjacent a floor by front and rear lower parallel horizontal rails and first side and second side lower parallel horizontal rails and four lower corner leg members in cooperation with the rails. A pair of front vertical rails and a pair of rear vertical rails are in further cooperation with the two upper front corner members and the two upper rear corner members and the four lower corner leg members.

A front upper horizontal rail is in cooperation with the front vertical rails. The front upper horizontal rail has a first end and a second end. The rear upper horizontal rail and first and second upper side parallel horizontal rails are located at a second predetermined height and the front upper horizontal rail is located at a third, lower predetermined height. The third predetermined height is greater than the first predetermined height and the second predetermined height is greater than the third predetermined height.

In a further variant, the support platform includes first and second intermediate side parallel horizontal rails and first and second horizontal support rails. The first and second intermediate side parallel horizontal rails have first and second ends, a mid point and are removably connected at the first and second ends to the front and rear vertical rails of the first and second side elements, respectively. The first and second horizontal support rails have first and second ends, a mid point and are removably connected at the first and second ends to the first and second intermediate side parallel horizontal rails.

In still a further variant, the support platform includes first, second, third and fourth support hangers. Each of the support hangers, has a first end, a second end, an inner side and an outer side. Each of the hangers has a curved hooking portion located at the first end. The hooking portion is sized and shaped to fit frictionally over the rigid frame and one of the first and second upper side horizontal rails. Each of the support hangers further includes at least two circular orifices. The orifices extend from the inner side to the outer side of the hangers. The hangers also include at least two spring button housings. The housings are located on the outer sides of the support hangers adjacent the orifices. Each of the spring button housings includes a finger opening.

Two support rods are provided. Each of the rods has a first end and a second end and is sized and shaped to extend between one of the first and second support hangers and one of the third and fourth support hangers when the support hangers are located on one of the first and second upper side horizontal rails. Each of the support rods has a spring button mounted at the first end and the second end. The spring button is sized and shaped to engage the spring button housing. When the first and second ends of the support rods are introduced into the orifices of the support hangers, and the support hangers are located on one of the first and second upper side horizontal rails, the spring buttons will removably engage the spring button housings of the hangers, thereby providing a support platform for the enclosure.

In yet another variant of the invention, the enclosure further includes at least one tie down strap. The strap is fixedly attached to a lower portion of the enclosure and serving to secure the enclosure to the rigid frame so as to prevent the enclosure from rocking on the support hangers.

In still another variant, the support platform includes a series of rigid floor panels. The floor panels are sized and shaped to fit within dimensions of the floor of the enclosure. A series of panel pockets is provided. The panel pockets have an upper surface and a lower surface and are fixedly attached at their upper surfaces to the lower surface of the enclosure. The panel pockets are sized and shaped to removably enclose the rigid floor panels.

A series of support bars are provided. The bars are sized and shaped to fit within dimensions of the floor of the enclosure. A series of bar pockets are provided. The bar pockets have an upper surface and a lower surface and are fixedly attached at their upper surfaces to the lower surface of the panel pockets. The bar pockets are sized and shaped to removably enclose the support bars. When the rigid floor panels are inserted into the panel pockets, the support bars are inserted into the bar pockets and the enclosure is installed on the rigid frame, the enclosure will include a support platform maintained at the first predetermined height.

In still a further variant of the invention, means are provided for pivotally mounting the front upper horizontal rail to the front vertical rails. Means are provided for pivotally mounting the rear upper horizontal rail to the upper rear corner members. Frame locking devices are pivotally mounted at center points of the front and rear upper horizontal rails. The frame locking devices permit the front and rear upper horizontal rail to pivot downwardly from an open top of the frame.

Means are provided for pivotally mounting the first and second upper side horizontal rails to the upper front and rear corner members. Frame locking devices are pivotally mounted at center points of the first and second upper side horizontal rails. The frame locking devices permit each of the rails to pivot downwardly from the open top of the frame.

Means are provided for pivotally mounting the first and second lower side horizontal rails to the lower front and rear corner leg members. Frame locking devices are pivotally mounted at center points of the first and second side lower horizontal rails. The frame locking devices permit each of the rails to pivot upwardly.

Means are provided for pivotally mounting the front and rear lower horizontal rails to the lower front and rear corner members, respectively. Frame locking devices are pivotally mounted at center points of the front and rear lower horizontal rails. The frame locking devices permit each of the rails to pivot upwardly. The frame may be quickly folded into a compact package for transport and storage by releasing the frame locking devices and depressing the upper horizontal rails downwardly while pulling upwardly on the lower horizontal rails, thereby causing the upper horizontal rails to bend downwardly and the lower horizontal rails to bend upwardly and the vertical rails to move inwardly.

In another variant, the means for removably connecting the first and second intermediate side parallel horizontal rails to the front and rear vertical rails of the first and second side elements and the first and second horizontal support rails to the first and second intermediate side parallel horizontal rails includes a plurality of coupling units. The coupling units are mounted to each of the first and second ends of the intermediate side parallel horizontal rails, the first and second horizontal support rails and front upper horizontal rail.

The coupling units include a T-shaped protrusion orthogonal to the rails and extending from a lower end of the coupling unit to an upper end of the coupling unit and terminating in a stop. A resilient securing tab is located on the coupling unit below the T-shaped protrusion. The securing tab includes a locking projection spaced downwardly from a lower end of the T-shaped protrusion and extending outwardly from the securing tab. The locking projection has a flattened upper surface orthogonal to the securing tab.

A series of receiving units are provided. The receiving units are mounted to each of the front and rear vertical rails and the intermediate side parallel horizontal rails. The receiving units have a mating T-shaped slot extending from an upper end of the receiving unit to a lower end of the receiving unit. The slot terminates in a closed end. The closed end has a flattened lower surface. The receiving units are sized shaped and located to removably secure the coupling units with the locking projection removably engaging the flattened lower surface of the closed end of the mating T-shaped slot when the T-shaped protrusion of the coupling unit is seated in the T-shaped slot of the receiving unit.

When the coupling units are removably attached to the receiving units, the first and second ends of the intermediate side parallel horizontal rails and the front upper horizontal rail will be removably attached to the front and rear vertical rails and the first and second horizontal support rails will be removably attached to the intermediate side parallel horizontal rails.

In yet another variant of the invention, the enclosure further includes a back wall, a front wall and first and second side walls. The back wall, first and second side walls extend from the floor to at least a height of the rear upper horizontal rail and first and second upper side parallel horizontal rails. The front wall extends from the floor to at least a height of the front upper horizontal rail.

Each of the walls has a padded inner layer. The inner layer is located between the front side element, back side element, first side element and second side element. Each of the walls has an outer layer. The outer layer extends outwardly from the rigid frame. The padded inner layers and the outer layers are joined along upper edges and outer corners to form a pocket enclosing the front and rear upper horizontal rail and first and second upper side parallel horizontal rails and upper portions of the front and rear vertical rails. At least one tie down is provided. The tie down is fixedly attached at a lower corner of the enclosure for removably securing the enclosure to the rigid frame.

In yet a further variant, the enclosure further includes a back wall, a front wall and first and second side walls. The back wall, first and second side walls extend from the floor to at least the height of the rear upper horizontal rail and first and second upper side parallel horizontal rails. The front wall extends from the floor to at least the height of the front upper horizontal rail. Each of the walls has a padded inner layer. The inner layer has an inner surface and an outer surface and is located between the front side element, back side element, first side element and second side element.

Each of the walls has an outer layer. The outer layer has an inner surface and an outer surface and extending outwardly from the rigid frame. The padded inner layers and the outer layers are joined along upper edges forming a series of exterior flaps extending downwardly from the front and rear upper horizontal rails and first and second upper side parallel horizontal rails. Means are provided for removably attaching the outer surfaces of the padded inner layers to the inner surfaces of the outer layers to secure the enclosure to the rigid frame.

In still a further variant of the invention, the enclosure further includes a series of rigid panels. The panels are sized and shaped to provide structural support for the back wall, front wall and first and second side walls of the enclosure. A series of pockets is provided. The pockets are located on the outer surface of the padded inner layers of the walls and are sized and shaped to removably enclose the rigid panels. A series of openings in the outer layers of the walls is provided for accessing the pockets. When the rigid panels are installed in the pockets, an occupant of the enclosure will not be able to push the walls outwardly beyond the rigid frame to produce an entrapping fold.

In yet a further variant, the enclosure further includes a series of rigid panels. The panels are sized and shaped to provide structural support for the back wall, front wall and first and second side walls of the enclosure. A series of pockets is provided. The pockets are located on the outer surface of the padded inner layers of the walls and are sized and shaped to removably enclose the rigid panels. When the rigid panels are installed in the pockets, an occupant of the enclosure will not be able to push the walls outwardly beyond the rigid frame to produce an entrapping fold.

In still another variant of the invention, the enclosure further includes a series of mesh panels. The mesh panels are located along lower portions of the padded inner layers of the walls. The mesh panels will provide additional breathing capability for an occupant of the enclosure that becomes trapped against one of the walls.

In yet another variant, the enclosure further includes a series of mesh panels. The mesh panels are located along lower portions of the padded inner layers of the walls. The mesh panels will provide additional breathing capability for an occupant of the enclosure that becomes trapped against one of the walls.

In yet a further variant, the means for removably attaching the rigid frame to the side of the parental bed includes a strap member having a first end and a second end. A resistance plate member is provided. The plate member has at least two slots vertically aligned and centrally located. The strap member is attached at the slots such that the first end and the second end are equidistant from the plate member. A pair of securing strap attachment means is provided. The securing strap attachment means are connected to either of the front and rear vertical rails of the rigid frame.

Attachment cooperation means are located at the first end and the second end of the strap member for reversible connection to the pair of securing strap attachment means. Adjusting means are provided for adjusting a length of the strap member and tightening it after connecting the attachment cooperation means to the pair of securing strap attachment means. The strap member is properly positioned when located under a mattress and above a surface on which the mattress rests and held in place by the resistance plate member located vertically at the side of the parental bed opposite placement of the co-sleeper and the adjusting means is tightened so the co-sleeper is held fast to the parental bed.

In still a further variant of the invention, the mattress pad has a top surface and a bottom surface and is covered with a washable fabric and padded on its top surface.

In another variant, the mattress pad is segmented into at least two segments closely aligned and is capable of being folded. The mattress pad serves as an enclosure for the co-sleeper when folded for transport and storage.

In still another variant, the mattress pad further includes at least one pair of reversibly separable attachment means and the enclosure comprises a series of openings sized shaped and located to permit the attachment means to secure the mattress pad to the support platform.

In a further variant, the rigid frame is formed of hollow tubing, the horizontal rails each have a first portion and a second portion, each portion has an inboard end and an outboard end, and the frame locking devices positioned at center points of the rails further include a connecting frame. The connecting frame is pivotally mounted to the inboard ends of each of the first and second portions of the horizontal rails. The connecting frame includes a pair of locking holes. A pair of spring-loaded buttons are mounted within the horizontal rails. The buttons are sized, shaped and located to engage the locking holes in the connecting frame when the first and second portions of the rails are collinear. Means are provided for pushing both buttons inwardly so as to clear the locking holes in the connecting frame simultaneously, thereby permitting the horizontal rails to be pivoted.

In still a further variant of the invention, means are provided for locking the spring-loaded buttons within the horizontal rails so as to clear the locking holes in the connecting frame after pushing the buttons inwardly when the first and second portions of the rails are collinear, thereby permitting easy folding of the rigid frame. Means are provided for unlocking the spring-loaded buttons upon folding of the rigid frame, thereby permitting the buttons to lock into the connecting frame when the rigid frame is unfolded.

In yet a further variant, the rigid frame is formed of hollow tubing, the horizontal rails each have a first portion and a second portion, each portion having an inboard end and an outboard end, and the frame locking devices positioned at center points of the rails further include an outer connecting housing, the connecting housing is formed of rigid material and is pivotally mounted to the inboard ends of each of the first and second portions of the horizontal rails. An inner spring housing is provided. The spring housing is pivotally mounted to the inboard ends of each of the first and second portions of the horizontal rails such that the pivotal mountings are collinear with the mountings of the outer connecting housing.

The inner spring housing is located within the outer connecting housing and is sized, shaped and located to fit frictionally about the inboard ends of each of the first and second portions of the rails and is capable of expanding within the outer connecting housing to permit pivoting of the inboard ends when the rigid frame is folded, thereby providing a means of locking the inboard ends in collinear alignment when the rigid frame is unfolded.

In still a further variant, the rigid frame is formed of hollow tubing, the horizontal rails each have a first portion and a second portion, each portion having an inboard end and an outboard end, and the frame locking devices positioned at center points of the rails further include a spring housing. The spring housing is pivotally mounted on a pair of mounting pins to the inboard ends of each of the first and second portions of the horizontal rails. The spring housing includes first and second pairs of arcurate alignment slots and first and second pairs of positioning detents.

First and second alignment pins are provided. The pins are mounted parallel to the mounting pins and spaced outwardly from the inboard ends of the first and second portions of the horizontal rails. The alignment pins are sized, shaped and located to fit slidably within the arcurate alignment slots. Each of the pairs of positioning detents is spaced apart by a distance slightly greater than a diameter of one of the horizontal rails. When the first and second portions of the horizontal rails are collinear, the rails will be within the spring housing and when the rails are pivoted with respect to one another to fold the rigid frame, the detents will be urged against the rails by the spring resistance of the housing, causing the housing to spread apart. This resistance serves to maintain the collinear alignment of the rails when the rigid frame is erected.

In a yet another variant of the invention, height adjusting extensions cooperate with each of the four lower corner leg members.

In another variant, the means for removably attaching the rigid frame to a side of the parental bed includes a strap member that has a first end and a second end. A pair of securing strap attachment means is provided. The securing strap attachment means are connected to the rigid frame of the co-sleeper. Attachment cooperation means are provided. The means are located at the first end and the second end of the strap member for reversible connection to the pair of securing strap attachment means. Adjusting means are provided for adjusting the length of the strap member and tightening it after connecting the attachment cooperation means to the pair of securing strap attachment means. The strap member is properly positioned when connected to one of the strap attachment means and extended over a top surface of the mattress, down a back side of the mattress and underneath the mattress and connected to the other strap attachment means and the adjusting means is tightened to prevent movement of the co-sleeper with respect to the parental bed.

In still another variant, the securing strap attachment means are connected to either of the front upper horizontal rail and front lower horizontal rail.

In yet another variant, the securing strap attachment means are connected to either of the front and rear vertical rails.

In yet a further variant of the invention, the means for removably attaching the rigid frame to the side of the parental bed includes a strap member having a first end and a second end. A securing strap attachment means is provided. The securing strap attachment means is located at the first end of the strap member. An attachment cooperation means is located at the second end of the strap member for reversible connection to the securing strap attachment means. Adjusting means are provided for adjusting the length of the strap member and tightening it after connecting the attachment cooperation means to the securing strap attachment means.

The strap member is properly positioned when extended over the top surface of the mattress, down the back side of the mattress and underneath the mattress, terminating behind the back side element with the securing strap attachment means connected to the attachment cooperation means and the adjusting means is tightened to prevent movement of the co-sleeper with respect to the parental bed.

In still a further variant, the means for removably attaching the rigid frame to the side of the parental bed includes a Y-shaped strap member. The strap member has a leg end and first and second arm ends. A resistance plate member is provided. The resistance plate member is located at the leg end of the Y-shaped strap member. A pair of securing strap attachment means is provided. The securing strap attachment means are connected to the rigid frame of the co-sleeper. Attachment cooperation means are located at the first and second arm ends of the Y-shaped strap member for reversible connection to the pair of securing strap attachment means.

Adjusting means are provided for adjusting the length of the strap member and tightening it after connecting the attachment cooperation means to the pair of securing strap attachment means. The strap member is properly positioned when located under the mattress and above the surface on which the mattress rests and held in place by the resistance plate member located vertically at the side of the parental bed opposite placement of the co-sleeper and the adjusting means is tightened so the co-sleeper is held fast to the parental bed.

In yet a further variant, the securing strap attachment means are connected to either of the front upper horizontal rail and front lower horizontal rail. In still another variant of the invention, the securing strap attachment means are connected to either of the front and rear vertical rails.

In still a further variant, the means for removably attaching the rigid frame to the side of the parental bed includes a Y-shaped strap member. The strap member has a leg end and first and second arm ends. A resistance plate member is provided. The resistance plate member is located at the leg end of the Y-shaped strap member. A securing strap attachment means is provided. The attachment means is located at the first arm end of the Y-shaped strap member. An attachment cooperation means is located at the second arm end of the Y-shaped strap member for reversible connection to the securing strap attachment means.

Adjusting means are provided for adjusting the length of the strap member and tightening it after connecting the attachment cooperation means to the securing strap attachment means. The strap member is properly positioned when located under the mattress and above the surface on which the mattress rests and held in place by the resistance plate member located vertically at the side of the parental bed opposite placement of the co-sleeper with the securing strap attachment means connected to the attachment cooperation means behind the back side element of the rigid frame and the adjusting means tightened so the co-sleeper is held fast to the parental bed.

In yet another variant of the invention, the means for removably attaching the rigid frame to the side of the parental bed includes a strap member having a first end and a second end. A hook member is slidably mounted to the strap member such that the first end and the second end are equidistant from the hook member. A pair of securing strap attachment means is provided. The securing strap attachment means are connected to the rigid frame of the co-sleeper. Attachment cooperation means are located at the first end and the second end of the strap member for reversible connection to the pair of securing strap attachment means.

Adjusting means are provided for adjusting a length of the strap member and tightening it after connecting the attachment cooperation means to the pair of securing strap attachment means. The strap member is properly positioned when located under the mattress and above the surface on which the mattress rests and extended downwardly to a bed frame and held in place by the hook member attaching to the bed frame at the side of the parental bed opposite placement of the co-sleeper and the adjusting means is tightened so the co-sleeper is held fast to the parental bed.

In yet a further variant, the securing strap attachment means are connected to either of the front upper horizontal rail and front lower horizontal rail. In still another variant the securing strap attachment means are connected to either of the front and rear vertical rails. In another variant of the invention, the means for removably attaching the rigid frame to the side of the parental bed includes a Y-shaped strap member. The strap member has a leg end and first and second arm ends. A hook member is provided. The hook member located at the leg end of the Y-shaped strap member. A pair of securing strap attachment means is provided. The securing strap attachment means are connected to the rigid frame of the co-sleeper. Attachment cooperation means are located at the first and second arm ends of the Y-shaped strap member for reversible connection to the pair of securing strap attachment means.

Adjusting means are provided for adjusting a length of the strap member and tightening it after connecting the attachment cooperation means to the pair of securing strap attachment means. The strap member is properly positioned when located under the mattress and above the surface on which the mattress rests and extended downwardly to the bed frame and held in place by the hook member attaching to the bed frame at the side of the parental bed opposite placement of the co-sleeper and the adjusting means tightened so the co-sleeper is held fast to the parental bed.

In still another variant, the securing strap attachment means are connected to either of the front upper horizontal rail and front lower horizontal rail. In yet another variant, the securing strap attachment means are connected to either of the front and rear vertical rails.

In a further variant, the means for removably attaching the rigid frame to the side of the parental bed includes a Y-shaped strap member. The strap member has a leg end and first and second arm ends. A hook member is provided. The hook member is located at the leg end of the Y-shaped strap member. A securing strap attachment means is provided. The attachment means is located at the first arm end of the Y-shaped strap member. An attachment cooperation means is located at the second arm end of the Y-shaped strap member for reversible connection to the securing strap attachment means.

Adjusting means are provided for adjusting a length of the strap member and tightening it after connecting the attachment cooperation means to the securing strap attachment means. The strap member is properly positioned when located under the mattress and above the surface on which the mattress rests and extended downwardly to the bed frame and held in place by the hook member attaching to the bed frame at the side of the parental bed opposite placement of the co-sleeper with the securing strap attachment means connected to the attachment cooperation means behind the back side element of the rigid frame and the adjusting means tightened so the co-sleeper is held fast to the parental bed.

In yet a further variant, the means for removably attaching the rigid frame to the side of the parental bed includes first and second strap members. Each of the strap members has a first end and a second end. A pair of securing strap attachment means is provided. The securing strap attachment means are connected to the rigid frame of the co-sleeper. Attachment cooperation means are located at the first ends of each of the first and second strap members for reversible connection to the pair of securing strap attachment means. First and second resistance plate members are provided. Each of the resistance plate members is attached to the second end of one of the first and second strap members.

Adjusting means are provided for adjusting a length of the first and second strap members and tightening them after connecting the attachment cooperation means to the pair of securing strap attachment means. The first and second strap members are properly positioned when located under the mattress and above the surface on which the mattress rests and held in place by the first and second resistance plate members located vertically at a side of the parental bed opposite placement of the co-sleeper and the adjusting means tightened so the co-sleeper is held fast to the parental bed.

In still a further variant of the invention, the securing strap attachment means are connected to either of the front upper horizontal rail and front lower horizontal rail. In yet a further variant, the securing strap attachment means are connected to either of the front and rear vertical rails.

In still another variant, the means for removably attaching the rigid frame to the side of the parental bed includes first and second strap members. Each of the strap members has a first end and a second end. A securing strap attachment means is located at the first end of the first strap member. An attachment cooperation means is located at the first end of the second strap member for reversible connection to the securing strap attachment means. First and second resistance plate members are provided. Each of the resistance plate members is attached to the second end of one of the first and second strap members.

Adjusting means are provided for adjusting a length of either of the first and second strap members and tightening it after connecting the attachment cooperation means to the securing strap attachment means. The first and second strap members are properly positioned when located under the mattress and above the surface on which the mattress rests and held in place by the first and second resistance plate members located vertically at the side of the parental bed opposite placement of the co-sleeper with the securing strap attachment means connected to the attachment cooperation means behind the back side element of the rigid frame and the adjusting means tightened so the co-sleeper is held fast to the parental bed.

In yet another variant, the means for removably attaching the rigid frame to the side of the parental bed includes first and second strap members. Each of the strap members has a first end and a second end. A pair of securing strap attachment means is provided. The securing strap attachment means is connected to the rigid frame of the co-sleeper. Attachment cooperation means are located at the first ends of each of the first and second strap members for reversible connection to the pair of securing strap attachment means. First and second hook members are provided. Each of the hook members is attached to the second end of one of the first and second strap members.

Adjusting means are provided for adjusting a length of the first and second strap members and tightening them after connecting the attachment cooperation means to the pair of securing strap attachment means. The first and second strap members are properly positioned when located under the mattress and above the surface on which the mattress rests and extended downwardly to a bed frame and held in place by the first and second hook members attaching to the bed frame at the side of the parental bed opposite placement of the co-sleeper and the adjusting means is tightened so the co-sleeper is held fast to the parental bed.

In yet a further variant, the securing strap attachment means are connected to either of the front upper horizontal rail and front lower horizontal rail. In still a further variant, the securing strap attachment means are connected to either of the front and rear vertical rails.

In still another variant of the invention, the means for removably attaching the rigid frame to the side of the parental bed includes first and second strap members. Each of the strap members has a first end and a second end. A securing strap attachment means is located at the first end of the first strap member. An attachment cooperation means is located at the first end of the second strap member for reversible connection to the securing strap attachment means. First and second hook members are provided. Each of the hook members is attached to the second end of one of the first and second strap members.

Adjusting means are provided for adjusting a length of either of the first and second strap members and tightening them after connecting the attachment cooperation means to the securing strap attachment means. The first and second strap members are properly positioned when located under the mattress and above the surface on which the mattress rests and extended downwardly to a bed frame and held in place by the first and second hook members attaching to the bed frame at the side of the parental bed opposite placement of the co-sleeper with the securing strap attachment means connected to the attachment cooperation means behind the back side element of the rigid frame and the adjusting means tightened so the co-sleeper is held fast to the parental bed.

In a further variant, the adjusting means is disposed at a point on the strap member adjacent the resistance plate member. In still a further variant, the adjusting means is disposed at the leg end of the Y-shaped strap member adjacent the resistance plate member. In yet a further variant of the invention, the adjusting means is disposed at a point on the strap member adjacent the hook member. In another variant, the adjusting means is disposed at the leg end of the Y-shaped strap member adjacent the hook member. In still another variant, the adjusting means are disposed at points on the first and second strap members adjacent the first and second resistance plate members. In a final variant of the invention, the adjusting means are disposed at points on the first and second strap member adjacent the first and second hook members.

DESCRIPTION OF THE DRAWINGS

FIG. 4 is a perspective view of the FIG. 2 rigid frame illustrating the first, second, third and fourth support hangers with at least two circular orifices and the two support rods;

FIG. 5 is a perspective view of the enclosure with at least one tie down strap fixedly attached to a lower portion of the enclosure;

FIG. 6 is a perspective view of the FIG. 5 enclosure illustrating the series of rigid floor panels, the series of panel pockets, the series of support bars and the series of bar pockets;

FIG. 15 is a perspective view of the means for removably attaching the rigid frame to the side of the parental bed illustrating the strap member, the resistance plate member, the attachment cooperation means, the adjusting means and the pair of securing strap attachment means connected to either of the rear vertical rails;

FIG. 15A is a detailed perspective view of the resistance plate, the adjusting means, the securing strap and the attachment cooperation means;

FIG. 16 is a partial cutaway perspective view of the mattress pad illustrating the top surface, bottom surface, washable fabric and padding on the top surface;

FIG. 17 is a perspective view of the mattress pad segmented into at least four segments;

FIG. 20 is a detailed perspective view of a portion of the FIG. 7 rigid frame illustrating, the upper horizontal rails, the frame locking device, the connecting frame, the pair of locking holes, the pair of spring-loaded buttons and the means for pushing both buttons inwardly;

FIG. 21 is a detailed perspective view of the FIG. 7 rigid frame illustrating the upper horizontal rails, an alternative frame locking device, the outer connecting housing and the inner spring housing;

FIG. 22 is a detailed perspective view of the FIG. 7 rigid frame illustrating the lower horizontal rails, the frame locking device, the spring housing, the first and second pair of arcurate alignment slots and the first and second alignment pins and the pair of positioning detents;

FIG. 23 is a perspective view of the FIG. 7 rigid frame illustrating the height adjusting extensions;

FIG. 35 is a perspective view of the means for removably attaching the rigid frame to the side of the parental bed illustrating the strap member, the Y-shaped strap member, the hook member, the pair of securing strap attachment means and the adjusting means;

FIG. 36 is a perspective view of the FIG. 2 rigid frame illustrating the Y-shaped strap member, the hook member and the securing strap means connected to the upper horizontal rail;

FIG. 36A is a detailed perspective view of the pair of securing strap attachment means, Y-shaped strap member, the hook member and the adjusting means;

FIG. 37 is a perspective view of the FIG. 2 rigid frame illustrating the Y-shaped strap member, the hook member and the securing strap means connected to either of the rear vertical rails;

FIG. 38 is a perspective view of the FIG. 2 rigid frame illustrating the Y-shaped strapped member, the hook member, the securing strap means, the attachment cooperation means and the adjusting means;

FIG. 39 is a perspective view of the means for removably attaching the rigid frame to the side of the parental bed illustrating the strap members and the first and second resistance plate members;

DETAILED DESCRIPTION OF THE PREFERRED EMBODIMENT

Figure 1:
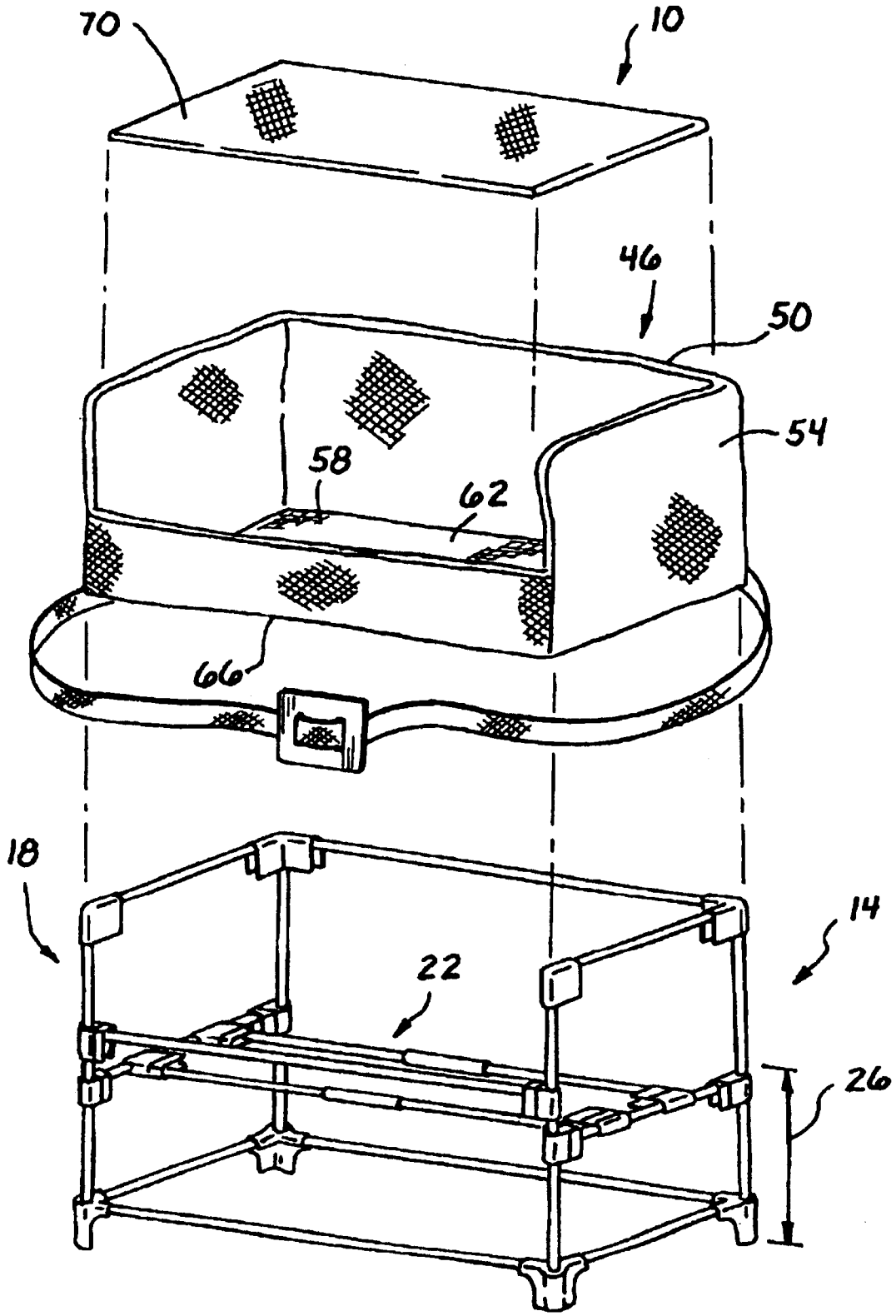
FIG. 1 is a perspective view of the rigid frame, the enclosure and the mattress pad.

FIGS. 1 and 15 illustrate a combination co-sleeper and changing table 10 providing the desired features that may be constructed from the following components. A rigid frame 14 is provided. The frame 14 provides means 18 for attaching a support platform 22 at a first predetermined height 26. The first predetermined height 26 is less than a height 30 of a top surface 34 of a mattress 38 of a parental bed 42. An enclosure 46 is provided. The enclosure 46 has an open top 50, a surrounding wall 54 and a floor 58, the floor 58 has an upper surface 62 and a lower surface 66. The enclosure 46 is sized and shaped to fit removably over the rigid frame 14 with the lower surface 66 of the floor 58 located upon the support platform 22. A mattress pad 70 is provided. The mattress pad 70 is sized and shaped to fit slidably within the enclosure 46. Means 74 are provided for removably attaching the rigid frame 14 to a side 78 of the parental bed 42.

Figure 2:
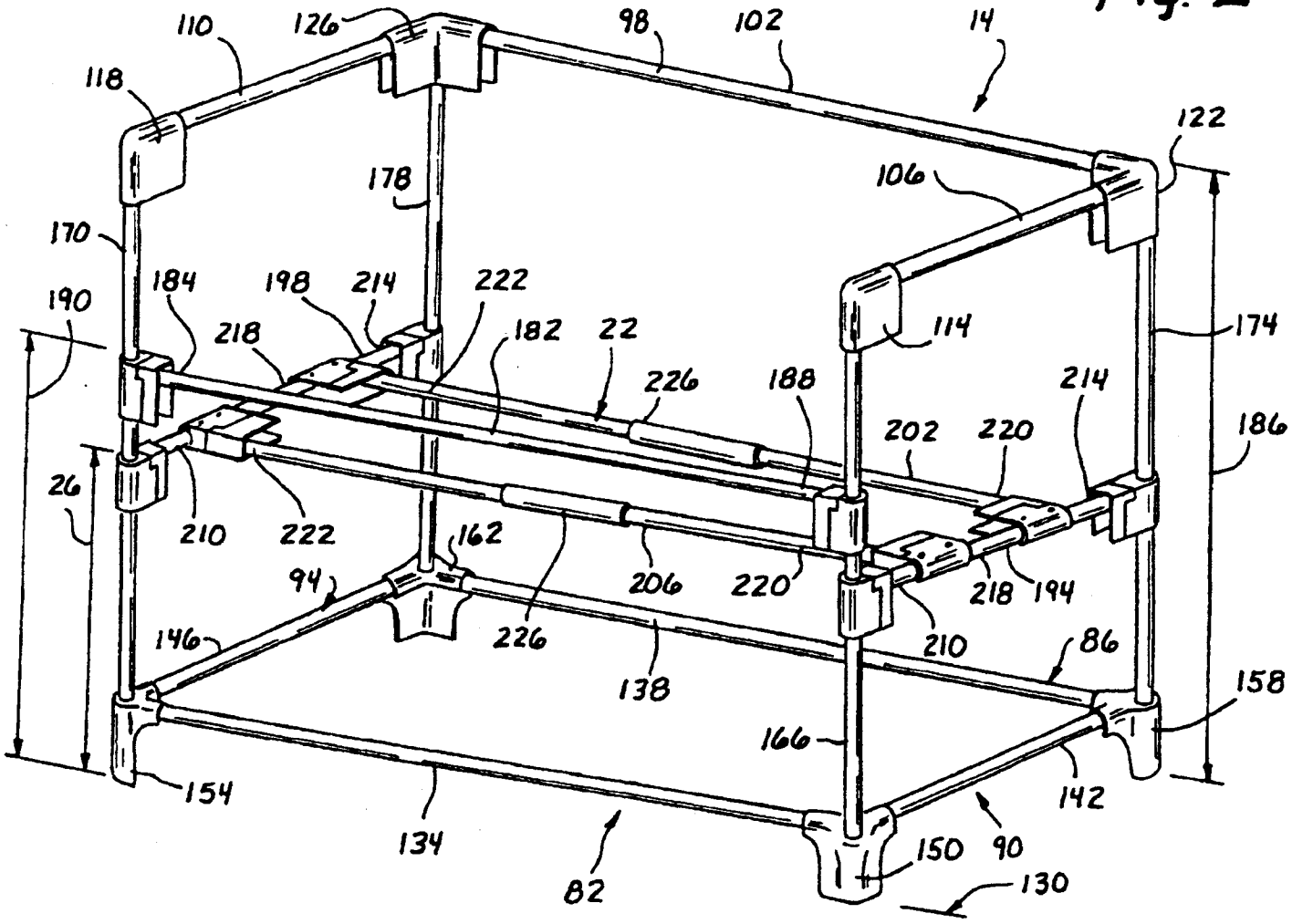
FIG. 2 is a perspective view of the rigid frame.

In a variant of the invention, as shown in FIG. 2, the rigid frame 14 includes a front side element 82, a back side element 86, a first side element 90 and a second side element 94. The rigid frame 14 is formed at a top 98 by a rear upper horizontal rail 102 and first 106 and second 110 upper side parallel horizontal rails and two upper front corner members 114, 118 and two upper rear corner members 122, 126 in cooperation with the rails 102, 106, 110. The rigid frame 14 is formed adjacent a floor 130 by front 134 and rear 138 lower parallel horizontal rails and first side 142 and second side 146 lower parallel horizontal rails and four lower corner leg members 150, 154, 158, 162 in cooperation with the rails 134, 138, 142, 146. A pair of front vertical rails 166, 170 and a pair of rear vertical rails 174, 178 are in further cooperation with the two upper front corner members 114, 118 and the two upper rear corner members 122, 126 and the four lower corner leg members 150, 154, 158, 162.

A front upper horizontal rail 182 is in cooperation with the front vertical rails 166, 170. The front upper horizontal rail 182 has a first end 184 and a second end 188. The rear upper horizontal rail 102 and first 106 and second 110 upper side parallel horizontal rails are located at a second predetermined height 186 and the front upper horizontal rail 182 is located at a third, lower predetermined height 190. The third predetermined height 190 is greater than the first predetermined height 26 and the second predetermined height 186 is greater than the third predetermined height 190.

Figure 3:
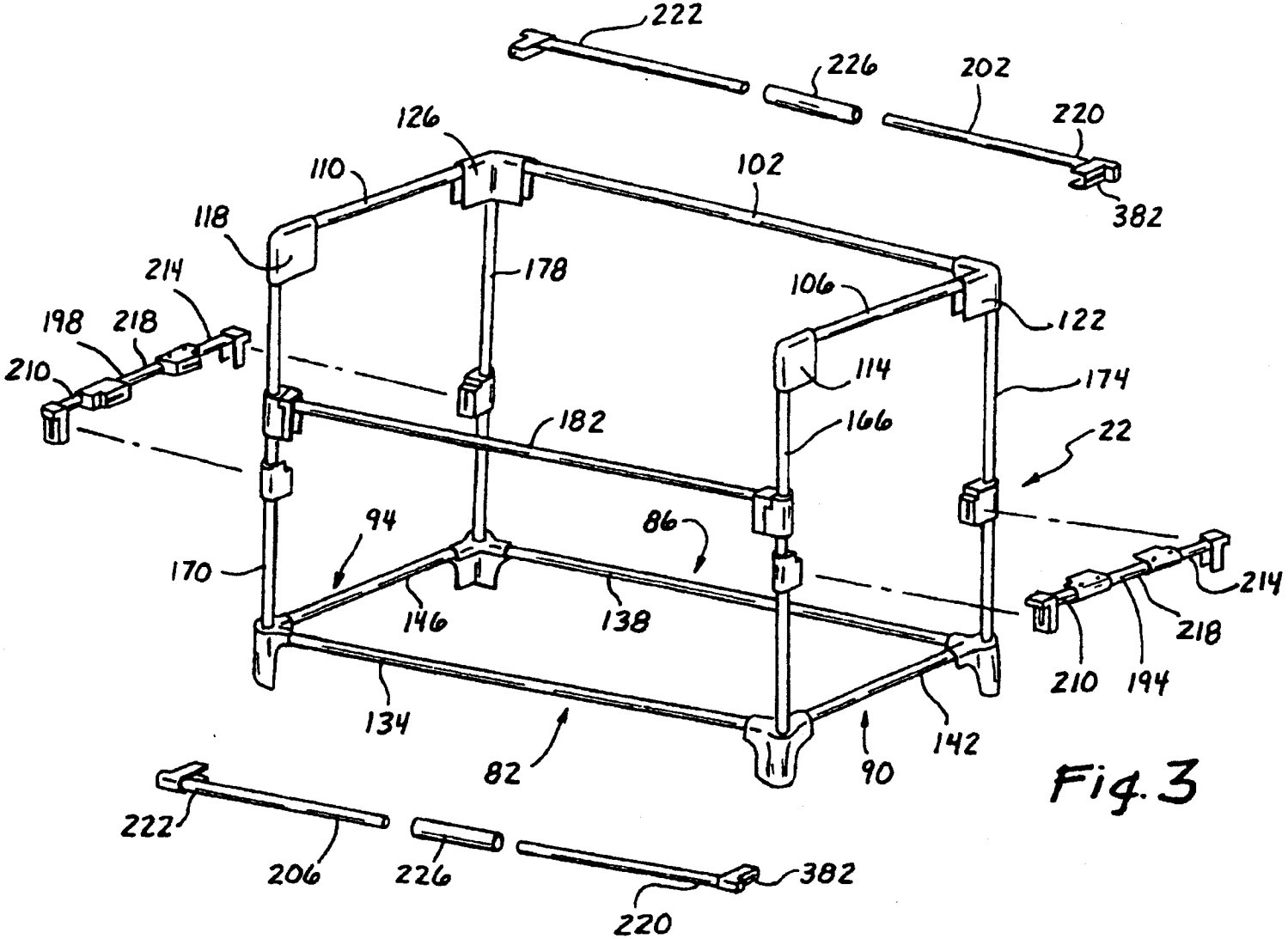
FIG. 3 is a perspective view of the FIG. 2 rigid frame illustrating the first and second intermediate side parallel horizontal rails and the first and second horizontal support rails.

In a further variant, as shown in FIG. 3, the support platform 22 includes first 194 and second 198 intermediate side parallel horizontal rails and first 202 and second 206 horizontal support rails. The first 194 and second 198 intermediate side parallel horizontal rails have first 210 and second 214 ends, a mid point 218 and are removably connected at the first 210 and second 214 ends to the front 166, 170 and rear 174, 178 vertical rails of the first 90 and second 94 side elements, respectively. The first 202 and second 206 horizontal support rails have first 220 and second 222 ends, a mid point 226 and are removably connected at the first 220 and second 222 ends to the first 194 and second 198 intermediate side parallel horizontal rails.

In still a further variant, as shown in FIG. 4, the support platform 22 includes first 230, second 234, third 238 and fourth 242 support hangers. Each of the support hangers 230, 234, 238, 242 has a first end 246, a second end 250, an inner side 254 and an outer side 258. Each of the hangers 230, 234, 238, 242 has a curved hooking portion 262 located at the first end 246. The hooking portion 262 is sized and shaped to fit frictionally over the rigid frame 14 and one of the first 106 and second 110 upper side horizontal rails. Each of the support hangers 230, 234, 238, 242 further includes at least two circular orifices 266. The orifices 266 extend from the inner side 254 to the outer side 258 of the hangers 230, 234, 238, 242. The hangers 230, 234, 238, 242 also include at least two spring button housings 270. The housings 270 are located on the outer sides 258 of the support hangers 230, 234, 238, 242 adjacent the orifices 266. Each of the spring button housings 270 includes a finger opening (not shown).

Two support rods 278 are provided. Each of the rods 278 has a first end 282 and a second end 286 and is sized and shaped to extend between one of the first 230 and second 234 support hangers and one of the third 238 and fourth 242 support hangers when the support hangers 230, 234, 238, 242 are located on one of the first 106 and second 110 upper side horizontal rails. Each of the support rods 278 has a spring button 290 mounted at the first end 282 and the second end 286. The spring button 290 is sized and shaped to engage the spring button housing 270. When the first 282 and second 286 ends of the support rods 278 are introduced into the orifices 266 of the support hangers 230, 234, 238, 242, and the support hangers 230, 234, 238, 242 are located on one of the first 106 and second 110 upper side horizontal rails, the spring buttons 290 will removably engage the spring button housings 270 of the hangers 230, 234, 238, 242, thereby providing a support platform 22 for the enclosure 46.

In yet another variant of the invention, as shown in FIG. 5, the enclosure 46 further includes at least one tie down strap 294. The strap 294 is fixedly attached to a lower portion 298 of the enclosure 46 and serving to secure the enclosure 46 to the rigid frame 14 so as to prevent the enclosure 46 from rocking on the support hangers 230, 234, 238, 242.

In still another variant, as shown in FIG. 6, the support platform 22 includes a series of rigid floor panels 302. The floor panels 302 are sized and shaped to fit within dimensions of the floor 58 of the enclosure 46. A series of panel pockets 306 is provided. The panel pockets 306 have an upper surface 310 and a lower surface 314 and are fixedly attached at their upper surfaces 310 to the lower surface 66 of the enclosure 46. The panel pockets 306 are sized and shaped to removably enclose the rigid floor panels 302.

A series of support bars 318 are provided. The bars 318 are sized and shaped to fit within dimensions of the floor 58 of the enclosure 46. A series of bar pockets 322 are provided. The bar pockets 322 have an upper surface 326 and a lower surface 330 and are fixedly attached at their upper surfaces 326 to the lower surface 314 of the panel pockets 306. The bar pockets 322 are sized and shaped to removably enclose the support bars 318. When the rigid floor panels 302 are inserted into the panel pockets 306, the support bars 318 are inserted into the bar pockets 322 and the enclosure 46 is installed on the rigid frame 14, the enclosure 46 will include a support platform 22 maintained at the first predetermined height 26.

Figure 7:
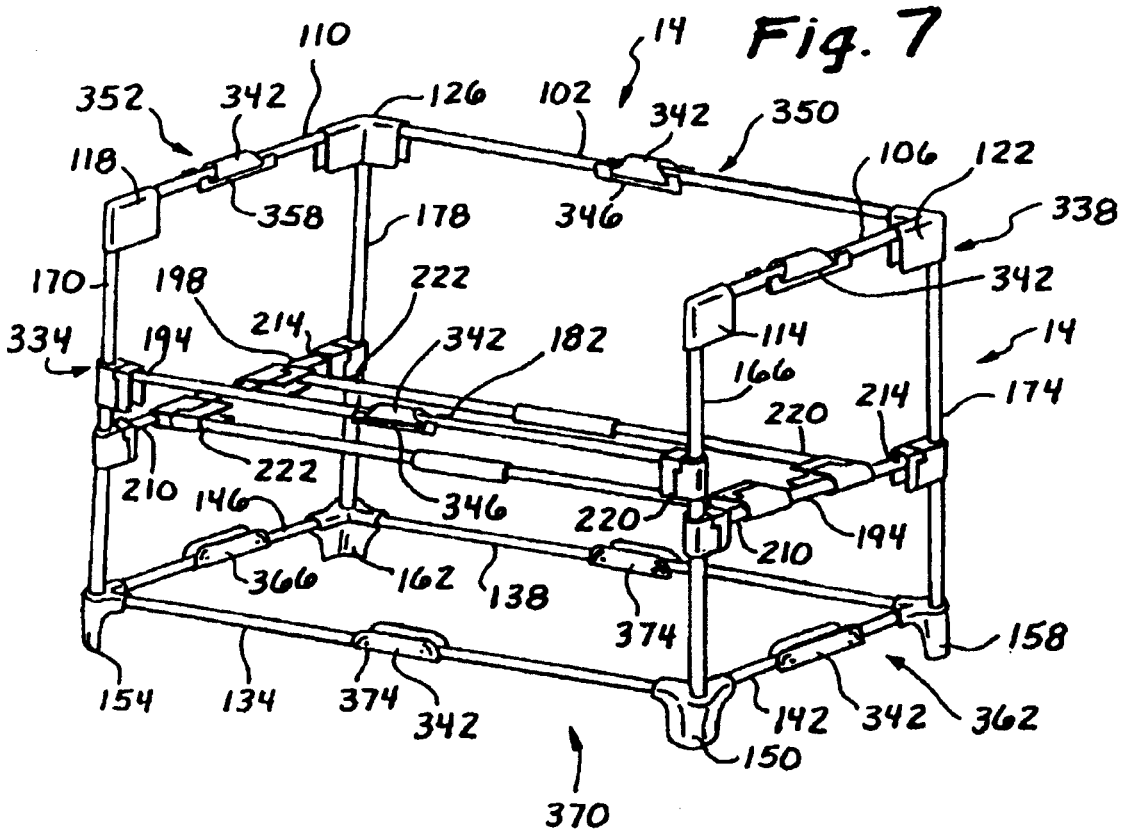
FIG. 7 is a perspective view of the FIG. 2 rigid frame illustrating the frame looking devices and frame pivoting devices.

In still a further variant of the invention, as shown in FIG. 7, means 334 are provided for pivotally mounting the front upper horizontal rail 182 to the front vertical rails 166, 170. Means 338 are provided for pivotally mounting the rear upper horizontal rail 102 to the upper rear corner members 122, 126. Frame locking devices 342 are pivotally mounted at center points 346 of the front 182 and rear 102 upper horizontal rails. The frame locking devices 342 permit the front 182 and rear 102 upper horizontal rail to pivot downwardly from an open top 350 of the frame 14.

Means 354 are provided for pivotally mounting the first 106 and second 110 upper side horizontal rails to the upper front 114, 118 and rear 122, 126 corner members. Frame locking devices 342 are pivotally mounted at center points 358 of the first 106 and second 110 upper side horizontal rails. The frame locking devices 342 permit each of the rails 106, 110 to pivot downwardly from the open top 350 of the frame 14.

Means 362 are provided for pivotally mounting the first 142 and second 146 lower side horizontal rails to the lower front 150, 154 and rear 158, 162 corner leg members. Frame locking devices 342 are pivotally mounted at center points 366 of the first 142 and second 146 lower side horizontal rails. The frame locking devices 342 permit each of the rails 142, 146 to pivot upwardly.

Means 370 are provided for pivotally mounting the front 134 and rear 138 lower horizontal rails to the lower front 150, 154 and rear 158, 162 corner members, respectively. Frame locking devices 342 are pivotally mounted at center points 374 of the front 134 and rear 138 lower horizontal rails. The frame locking devices 342 permit each of the rails 134, 138 to pivot upwardly. The frame 14 may be quickly folded into a compact package (not shown) for transport and storage by releasing the frame locking devices 342 and depressing the upper horizontal rails 182, 102 downwardly while pulling upwardly on the lower horizontal rails 134, 138, thereby causing the upper horizontal rails 182, 102 to bend downwardly and the lower horizontal rails 134, 138 to bend upwardly and the vertical rails 166, 170, 174, 178 to move inwardly.

Figure 8:
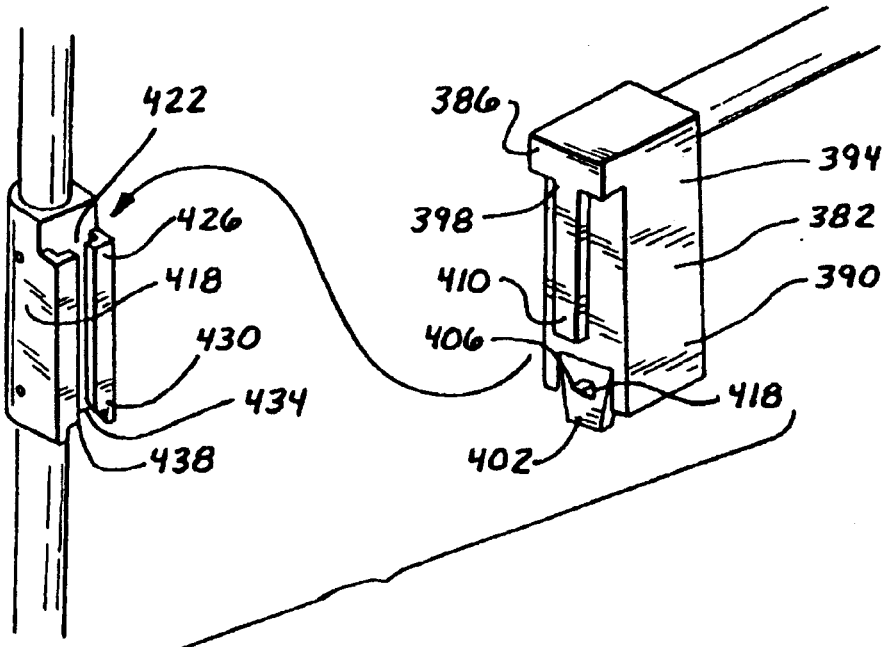
FIG. 8 is a perspective view of the means for removably connecting the first and second intermediate side parallel horizontal rails to the front and rear vertical rails of the first and second side elements and the first and second horizontal support rails to the first and second intermediate side parallel horizontal rails illustrating the coupling unit, the T-shaped protrusion, the resilient securing tab, the locking protrusion, the T-shaped slot and the receiving unit.

In another variant, as shown in FIG. 8, the means for removably connecting the first 194 and second 198 intermediate side parallel horizontal rails to the front 166, 170 and rear 174, 178 vertical rails of the first 90 and second 94 side elements and the first 202 and second 206 horizontal support rails to the first 194 and second 198 intermediate side parallel horizontal rails includes a plurality of coupling units 382. The coupling units 382 are mounted to each of the first 210, 220, 184 and second 214, 222, 188 ends of the intermediate side parallel horizontal rails 194, 198, the first 202 and second 206 horizontal support rails and front upper horizontal rail 182.

The coupling units 382 include a T-shaped protrusion 386 orthogonal to the rails 194, 198, 202, 206, 182 and extending from a lower end 390 of the coupling unit 382 to an upper end 394 of the coupling unit 382 and terminating in a stop 398. A resilient securing tab 402 is located on the coupling unit 382 below the T-shaped protrusion 386. The securing tab 402 includes a locking projection 406 spaced downwardly from a lower end 410 of the T-shaped protrusion 386 and extending outwardly from the securing tab 402. The locking projection 406 has a flattened upper surface 414 orthogonal to the securing tab 402.

A series of receiving units 418 are provided. The receiving units 418 are mounted to each of the front 166, 170 and rear 174, 178 vertical rails and the intermediate side parallel horizontal rails 194, 198. The receiving units 418 have a mating T-shaped slot 422 extending from an upper end 426 of the receiving unit 418 to a lower end 430 of the receiving unit 418. The slot 422 terminates in a closed end 434. The closed end 434 has a flattened lower surface 438. The receiving units 418 are sized shaped and located to removably secure the coupling units 382 with the locking projection 406 removably engaging the flattened lower surface 438 of the closed end 434 of the mating T-shaped slot 422 when the T-shaped protrusion 386 of the coupling unit 382 is seated in the T-shaped slot 422 of the receiving unit 418.

When the coupling units 382 are removably attached to the receiving units 418, the first 210, 184 and second 214, 188 ends of the intermediate side parallel horizontal rails 194, 198 and the front upper horizontal rail 182 will be removably attached to the front 166, 170 and rear 174, 178 vertical rails and the first 202 and second 206 horizontal support rails will be removably attached to the intermediate side parallel horizontal rails 194, 198.

Figure 9:
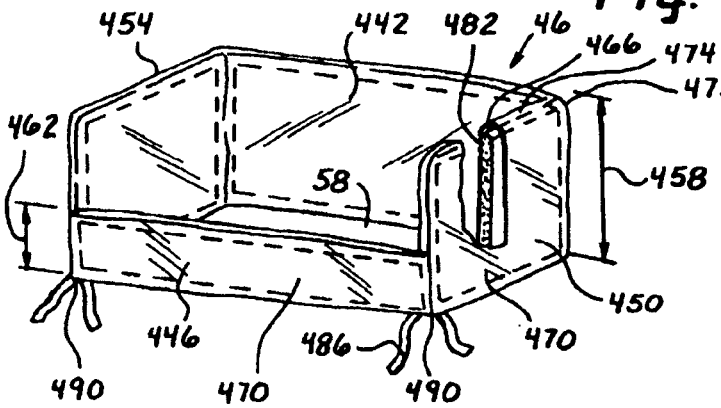
FIG. 9 is a partial cutaway perspective view of a variant of the enclosure illustrating the outer layers, the padded inner layers of the back wall, front wall and first and second side walls and the tie downs.

In yet another variant of the invention, as shown in FIG. 9, the enclosure 46 further includes a back wall 442, a front wall 446 and first 450 and second 454 side walls. The back wall 442, first 450 and second 454 side walls extend from the floor 58 to at least a height 458 of the rear upper horizontal rail 102 and first 106 and second 110 upper side parallel horizontal rails. The front wall 446 extends from the floor 58 to at least a height 462 of the front upper horizontal rail 182.

Each of the walls 442, 446, 450, 454 has a padded inner layer 466. The inner layer 466 is located between the front side element 82, back side element 86, first side element 90 and second side element 94. Each of the walls 442, 446, 450, 454 has an outer layer 470. The outer layer 470 extends outwardly from the rigid frame 14. The padded inner layers 466 and the outer layers 470 are joined along upper edges 474 and outer corners 478 to form a pocket 482 enclosing the front 182 and rear 102 upper horizontal rails and first 106 and second 110 upper side parallel horizontal rails and upper portions 486 of the front 166, 170 and rear 174, 178 vertical rails. At least one tie down 486 is provided. The tie down 486 is fixedly attached at a lower corner 490 of the enclosure 46 for removably securing the enclosure 46 to the rigid frame 14.

Figure 10:
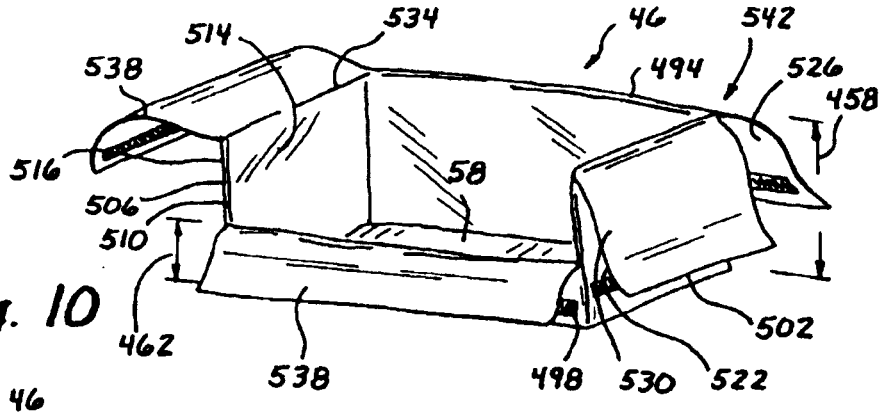
FIG. 10 is a perspective view of another variant of the enclosure illustrating the series of exterior flaps joined along upper edges of the padded inner layers and the outer layers.

In yet a further variant, as shown in FIG. 10, the enclosure 46 further includes a back wall 494, a front wall 498 and first 502 and second 506 side walls. The back wall 494, first 502 and second 506 side walls extend from the floor 58 to at least the height 458 of the rear upper horizontal rail 102 and first 106 and second 110 upper side parallel horizontal rails. The front wall 498 extends from the floor 58 to at least the height 462 of the front upper horizontal rail 182. Each of the walls 494, 498, 502, 506 has a padded inner layer 510. The inner layer 510 has an inner surface 514 and an outer surface 518 and is located between the front side element 82, back side element 86, first side element 90 and second side element 94.

Each of the walls 494, 498, 502, 506 has an outer layer 522. The outer layer 522 has an inner surface 526 and an outer surface 530 and extends outwardly from the rigid frame 14. The padded inner layers 510 and the outer layers 522 are joined along upper edges 534 forming a series of exterior flaps 538 extending downwardly from the front 182 and rear upper 102 horizontal rail and first 106 and second 110 upper side parallel horizontal rails. Means 542 are provided for removably attaching the outer surfaces 518 of the padded inner layers 510 to the inner surfaces 526 of the outer layers 522 to secure the enclosure 46 to the rigid frame 14.

Figure 11:
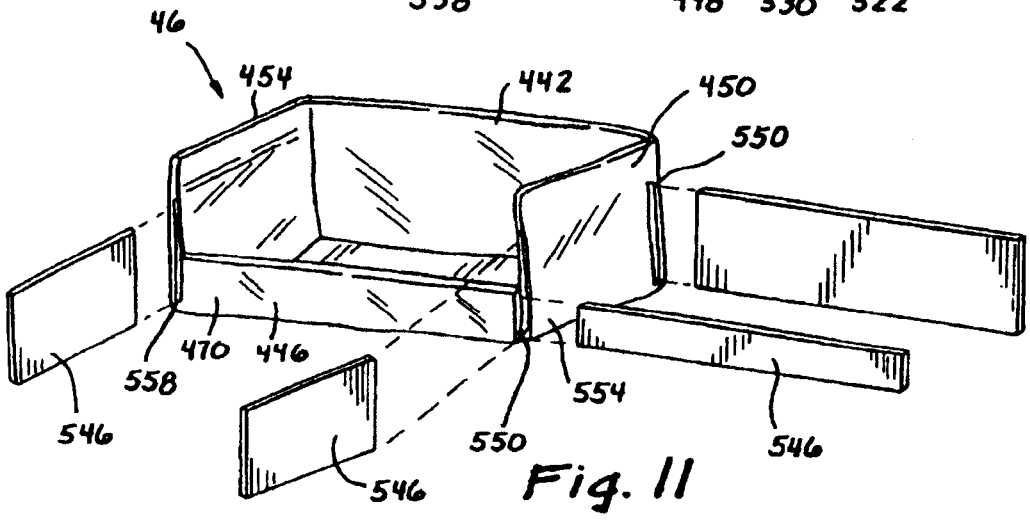
FIG. 11 is a perspective view of another variant of the enclosure illustrating the series of rigid panels, the series of pockets and the series of openings.

In still a further variant of the invention, as shown in FIG. 11, the enclosure 46 further includes a series of rigid panels 546. The panels 546 are sized and shaped to provide structural support for the back wall 442, front wall 446 and first 450 and second 454 side walls of the enclosure 46. A series of pockets 550 is provided. The pockets 550 are located on an outer surface 554 of the padded inner layers 466 of the walls 442, 446, 450, 454 and are sized and shaped to removably enclose the rigid panels 546. A series of openings 558 in the outer layers 470 of the walls 442, 446, 450, 454 is provided for accessing the pockets 550. When the rigid panels 546 are installed in the pockets 550, an occupant 562 (not shown) of the enclosure 46 will not be able to push the walls 442, 446, 450, 454 outwardly beyond the rigid frame 14 to produce an entrapping fold (not shown).

Figure 12:
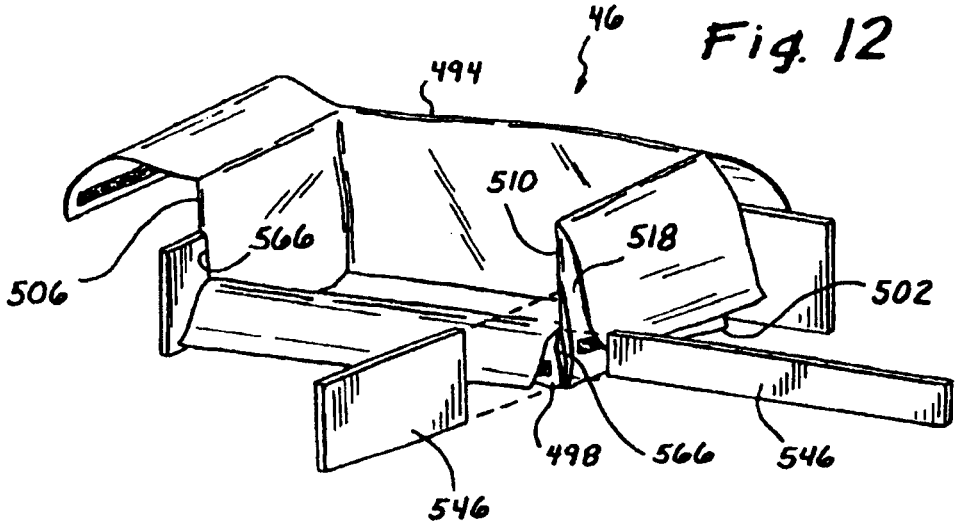
FIG. 12 is a perspective view of another variant of the enclosure illustrating the series of exterior flaps, the rigid panels, the series of pockets.

In yet a further variant, as shown in FIG. 12, the enclosure 46 further includes a series of rigid panels 546. The panels 546 are sized and shaped to provide structural support for the back wall 494, front wall 498 and first 502 and second 506 side walls of the enclosure 46. A series of pockets 566 is provided. The pockets 566 are located on the outer surface 518 of the padded inner layers 510 of the walls 494, 498, 502, 506 and are sized and shaped to removably enclose the rigid panels 546. When the rigid panels 546 are installed in the pockets 566, an occupant (not shown) of the enclosure 46 will not be able to push the walls 494, 498, 502, 506 outwardly beyond the rigid frame 14 to produce an entrapping fold (not shown).

Figure 13:
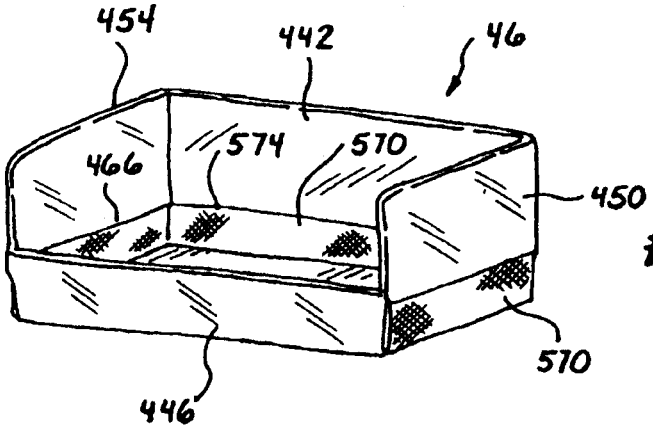
FIG. 13 is a perspective view of another variant of the enclosure illustrating the series of mesh panels.

In still another variant of the invention, as shown in FIG. 13, the enclosure 46 further includes a series of mesh panels 570. The mesh panels 570 are located along lower portions 574 of the padded inner layers 466 of the walls 442, 446, 450, 454. The mesh panels 570 will provide additional breathing capability for an occupant (not shown) of the enclosure 46 that becomes trapped against one of the walls 442, 446, 450, 454.

Figure 14:
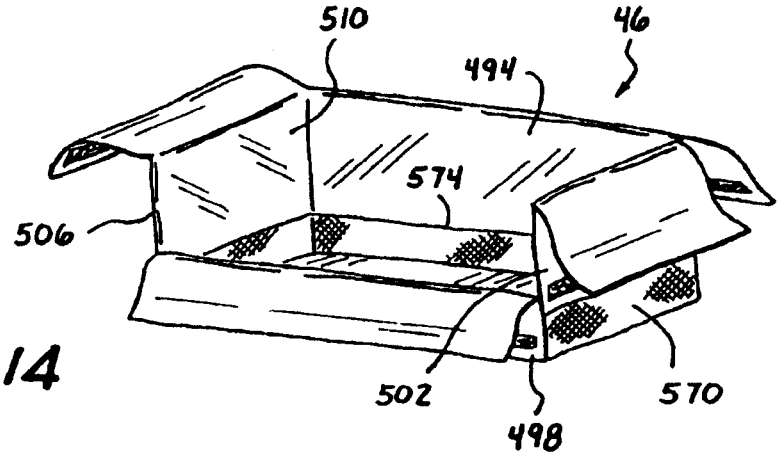
FIG. 14 is a perspective view of another variant of the enclosure illustrating the series of exterior flaps and the series of mesh panels.

In yet another variant, as shown in FIG. 14, the enclosure 46 further includes a series of mesh panels 570. The mesh panels 570 are located along lower portions 574 of the padded inner layers 510 of the walls 494, 498, 502, 506. The mesh panels 570 will provide additional breathing capability for an occupant (not shown) of the enclosure 46 that becomes trapped against one of the walls 494, 498, 502, 506.

In yet a further variant, as shown in FIG. 15, the means 74 for removably attaching the rigid frame 14 to the side 78 of the parental bed 42 includes a strap member 578 having a first end 582 and a second end 586. A resistance plate member 590 is provided. The plate member 590 has at least two slots 594 vertically aligned and centrally located. The strap member 578 is attached at the slots 594 such that the first end 582 and the second end 586 are equidistant from the plate member 590. A pair of securing strap attachment means 598 is provided. The securing strap attachment means 598 are connected to either of the front 166, 170 and rear 174, 178 vertical rails of the rigid frame 14.

Attachment cooperation means 602 are located at the first end 582 and the second end 586 of the strap member 578 for reversible connection to the pair of securing strap attachment means 598. Adjusting means 606 are provided for adjusting a length of the strap member 578 and tightening it after connecting the attachment cooperation means 602 to the pair of securing strap attachment means 598. The strap member 578 is properly positioned when located under a mattress 610 and above a surface 614 on which the mattress 610 rests and held in place by the resistance plate member 590 located vertically at the side 78 of the parental bed 42 opposite placement of the co-sleeper 10 and the strap member 578 is tightened so the co-sleeper 10 is held fast to the parental bed 42.

In still a further variant of the invention, as shown in FIG. 16, the mattress pad 70 has a top surface 618 and a bottom surface 622 and is covered with a washable fabric 626 and padded on its top surface 618.

In another variant, as shown in FIG. 17, the mattress pad 70 is segmented into at least two segments 630 closely aligned and is capable of being folded. The mattress pad 70 serves as an enclosure (not shown) for the co-sleeper 10 when folded for transport and storage.

Figure 18:
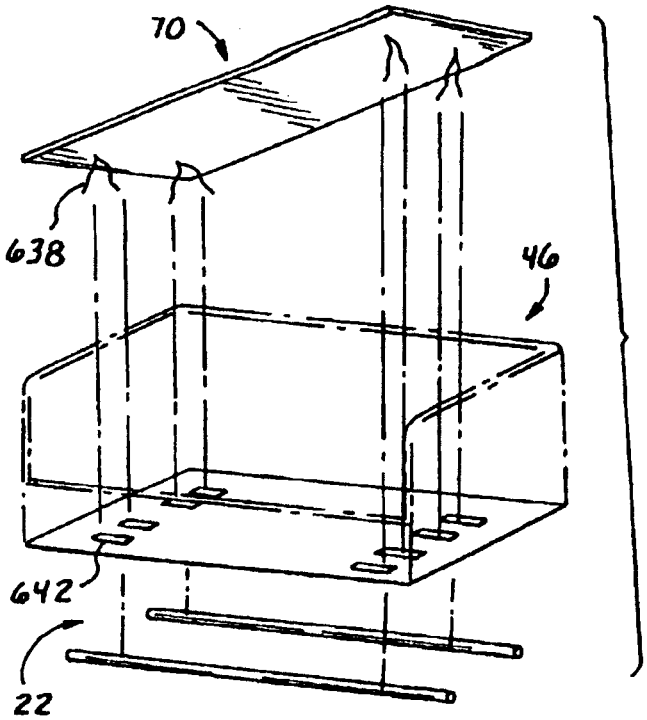
FIG. 18 is a perspective view of the mattress pad illustrating the at least one pair of reversibly separable attachment means and the series of openings on the enclosure.

In still another variant, as shown in FIG. 18, the mattress pad 70 further includes at least one pair of reversibly separable attachment means 638 and the enclosure 46 comprises a series of openings 642 sized shaped and located to permit the attachment means 638 to secure the mattress pad 70 to the support platform 22.

Figure 19:
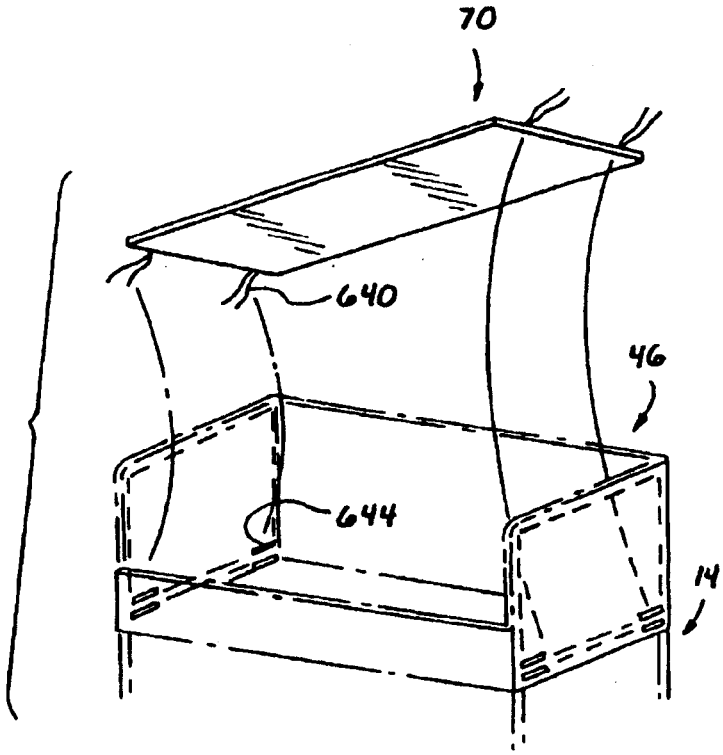
FIG. 19 is a perspective view of the mattress pad illustrating teat least one pair of reversibly separable attachment means and another series of openings on the enclosure.

In yet another variant of the invention, as shown in FIG. 19, the mattress pad 70 includes at least one pair of reversibly separable attachment means 640 and the enclosure 46 further comprises a series of openings 644 sized shaped and located to permit the attachment means 640 to secure the mattress pad 70 to the rigid frame 14.

In a further variant, as shown in FIG. 20, the rigid frame 14 is formed of hollow tubing 646, the horizontal rails 182, 102, 106, 110, 134, 138, 142, 146 each have a first portion 650 and a second portion 654, each portion 650, 654 has an inboard end 658 and an outboard end 662, and the frame locking devices 342 positioned at center points 346 of the rails 182, 102, 106, 110, 134, 138, 142, 146 further include a connecting frame 666. The connecting frame 666 is pivotally mounted to the inboard ends 658 of each of the first 650 and second 654 portions of the horizontal rails 182, 102, 106, 110, 134, 138, 142, 146. The connecting frame 666 includes a pair of locking holes 670. A pair of spring-loaded buttons 674 are mounted within the horizontal rails 182, 102, 106, 110, 134, 138, 142, 146. The buttons 674 are sized, shaped and located to engage the locking holes 670 in the connecting frame 666 when the first 650 and second 654 portions of the rails 182, 102, 106, 110, 134, 138, 142, 146 are collinear. Means 678 are provided for pushing both buttons 674 inwardly so as to clear the locking holes 670 in the connecting frame 666 simultaneously, thereby permitting the horizontal rails 182, 102, 106, 110, 134, 138, 142, 146 to be pivoted.

In still a further variant of the invention, as shown in FIG. 20, means 682 are provided for locking the spring-loaded buttons 674 within the horizontal rails 182, 102, 106, 110, 134, 138, 142, 146 so as to clear the locking holes 670 in the connecting frame 666 after pushing the buttons 674 inwardly when the first 650 and second 654 portions of the rails 182, 102, 106, 110, 134, 138, 142, 146 are collinear, thereby permitting easy folding of the rigid frame 14. Means 686 are provided for unlocking the spring-loaded buttons 674 upon folding of the rigid frame 14, thereby permitting the buttons 674 to lock into the connecting frame 666 when the rigid frame 14 is unfolded.

In yet a further variant, as shown in FIG. 21, the rigid frame 14 is formed of hollow tubing 646, the horizontal rails 182, 102, 106, 110, 134, 138, 142, 146 each have a first portion 650 and a second portion 654, each portion 650, 654 having an inboard end 658 and an outboard end 662, and the frame locking devices 342 positioned at center points 346 of the rails 182, 102, 106, 110, 134, 138, 142, 146 further include an outer connecting housing 690, the connecting housing 690 is formed of rigid material and is pivotally mounted to the inboard ends 658 of each of the first 650 and second 654 portions of the horizontal rails 182, 102, 106, 110, 134, 138, 142, 146. An inner spring housing 694 is provided. The spring housing 694 is pivotally mounted to the inboard ends 658 of each of the first 650 and second 654 portions of the horizontal rails 182, 102, 106, 110, 134, 138, 142, 146 such that the pivotal mountings are collinear with the mountings of the outer connecting housing 690.

The inner spring housing 694 is located within the outer connecting housing 690 and is sized, shaped and located to fit frictionally about the inboard ends 658 of each of the first 650 and second 654 portions of the rails 182, 102, 106, 110, 134, 138, 142, 146 and is capable of expanding within the outer connecting housing 690 to permit pivoting of the inboard ends 658 when the rigid frame 14 is folded, thereby providing a means 698 of locking the inboard ends 658 in collinear alignment when the rigid frame 14 is unfolded.

In still a further variant, as shown in FIG. 22, the rigid frame 14 is formed of hollow tubing 646, the horizontal rails 182, 102, 106, 110, 134, 138, 142, 146 each have a first portion 650 and a second portion 654, each portion 650, 654 having an inboard end 658 and an outboard end 662, and the frame locking devices 342 positioned at center points 346 of the rails 182, 102, 106, 110, 134, 138, 142, 146 further include a spring housing 702. The spring housing 702 is pivotally mounted on a pair of mounting pins 706 to the inboard ends 658 of each of the first 650 and second portions 654 of the horizontal rails 182, 102, 106, 110, 134, 138, 142, 146. The spring housing 702 includes first 710 and second 714 pairs of arcurate alignment slots and first 718 and second 722 pairs of positioning detents.

First 726 and second 730 alignment pins are provided. The pins 726, 730 are mounted parallel to the mounting pins 706 and spaced outwardly from the inboard ends 658 of the first 650 and second 654 portions of the horizontal rails 182, 102, 106, 110, 134, 138, 142, 146. The alignment pins 726, 730 are sized, shaped and located to fit slidably within the arcurate alignment slots 710, 714. Each of the pairs of positioning detents 718, 722 is spaced apart by a distance slightly greater than a diameter 734 of one of the horizontal rails 182, 102, 106, 110, 134, 138, 142, 146. When the first 650 and second 654 portions of the horizontal rails 182, 102, 106, 110, 134, 138, 142, 146 are collinear, the rails 182, 102, 106, 110, 134, 138, 142, 146 will be within the spring housing 702 and when the rails 182, 102, 106, 110, 134, 138, 142, 146 are pivoted with respect to one another to fold the rigid frame 14, the detents 718, 722 will be urged against the rails 182, 102, 106, 110, 134, 138, 142, 146 by the spring resistance of the housing 702, causing the housing 702 to spread apart. This resistance serves to maintain the collinear alignment of the rails 182, 102, 106, 110, 134, 138, 142, 146 when the rigid frame 14 is erected.

In a yet another variant of the invention, as shown in FIG. 23, height adjusting extensions 738 cooperate with each of the four lower corner leg members 150, 154, 158, 162.

Figure 24:
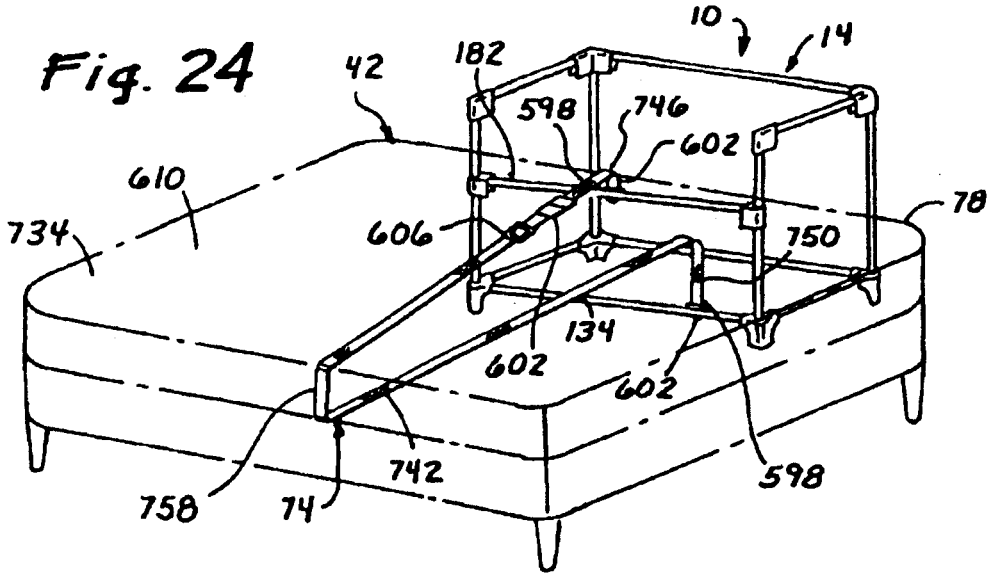
FIG. 24 is a perspective view of the means for removably attaching the rigid frame to the side of the parental bed illustrating the securing strap attachment means connected to either of the front upper horizontal rail and the front lower horizontal rail, the attachment cooperation means and the adjusting means.

In another variant, as shown in FIG. 24, the means 74 for removably attaching the rigid frame 14 to U side 78 of the parental bed 42 includes a strap member 742 that has a first end 746 and a second end 750. A pair of securing strap attachment means 598 is provided. The securing strap attachment means 598 are connected to the rigid frame 14 of the co-sleeper 10. Attachment cooperation means 602 are provided, the means 602 are located at the first end 746 and the second end 750 of the strap member 742 for reversible connection to the pair of securing strap attachment means 598. Adjusting means 606 are provided for adjusting a length of the strap member 742 and tightening it after connecting the attachment cooperation means 602 to the pair of securing strap attachment means 598. The strap member 742 is properly positioned when connected to one of the strap attachment means 598 and extended over a top surface 754 of the mattress 610, down a back side 758 of the mattress 610 and underneath the mattress 610 and connected to the other strap attachment means 598 and the adjusting means 606 is tightened to prevent movement of the co-sleeper 10 with respect to the parental bed 42.

In still another variant, as shown in FIG. 24, the securing strap attachment means 598 are connected to either of the front upper horizontal rail 182 and front lower horizontal rail 134.

Figure 25:
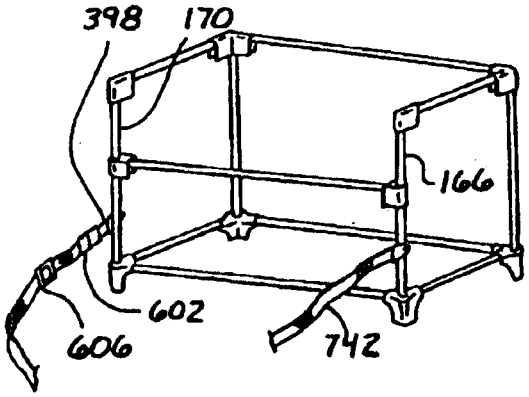
FIG. 25 is a perspective view of the FIG. 2 rigid frame illustrating the securing strap attachment means connected to either of the front vertical rails.
Figure 26:
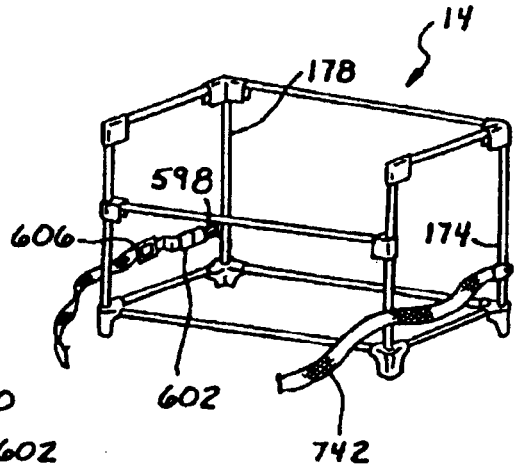
FIG. 26 is a perspective view of the FIG. 2 rigid frame illustrating the securing strap attachment means connected to either of the rear vertical rails.

In yet another variant, as shown in FIG. 25 and FIG. 26, the securing strap attachment means 598 are connected to either of the front 166, 170 and rear 174, 178 vertical rails.

Figure 27:
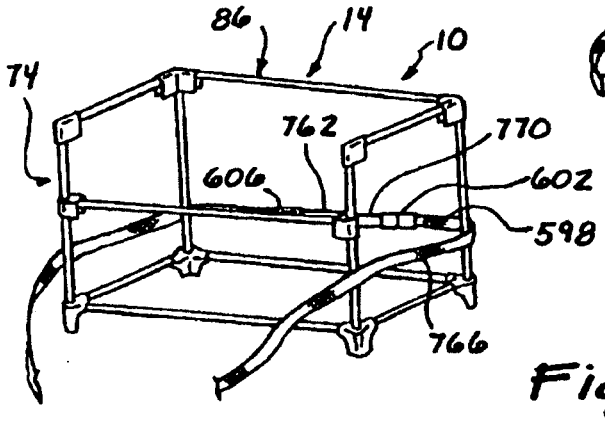
FIG. 27 is a perspective view of the FIG. 2 rigid frame illustrating the securing strap attachment means, die attachment cooperation means and the adjusting means.

In yet a further variant of the invention, as shown in FIG. 27, the means 74 for removably attaching the rigid frame 14 to the side 78 of the parental bed 42 includes a strap member 762 having a first end 766 and a second end 770. A securing strap attachment means 598 is provided. The securing strap attachment means 598 is located at the first end 766 of the strap member 762. An attachment cooperation means 602 is located at the second end 770 of the strap member 762 for reversible connection to the securing strap attachment means 598. Adjusting means 606 are provided for adjusting a length of the strap member 762 and tightening it after connecting the attachment cooperation means 602 to the securing strap attachment means 598.

The strap member 762 is properly positioned when extended over the top surface 754 of the mattress 610, down the back side 758 of the mattress 610 and underneath the mattress 610, terminating behind the back side element 86 with the securing strap attachment means 598 connected to the attachment cooperation means 602 and the adjusting means 606 is tightened to prevent movement of the co-sleeper 10 with respect to the parental bed 42 (not shown).

Figure 28:
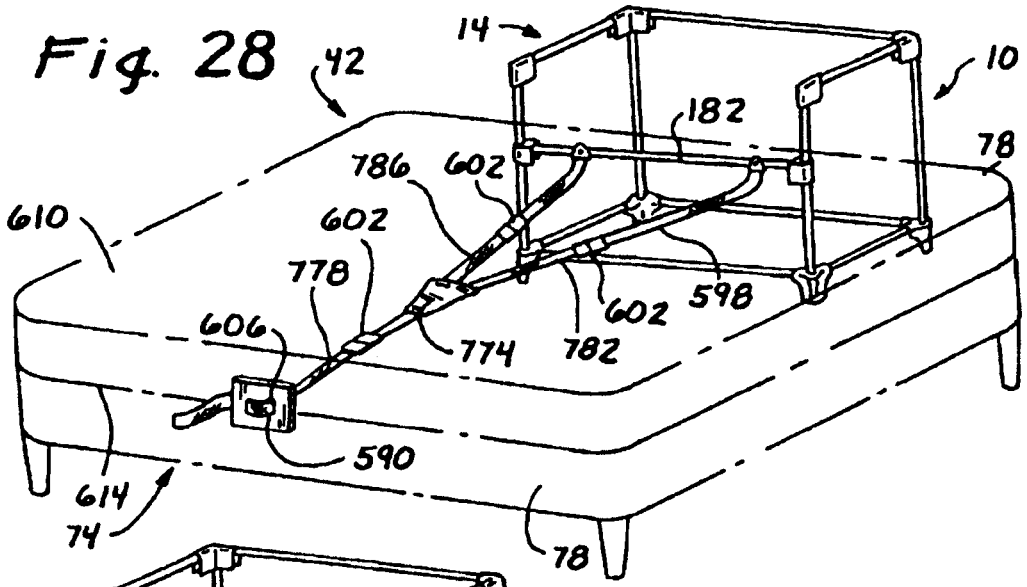
FIG. 28 is a perspective view of the means for removably attaching the rigid frame to the side of the parental bed illustrating the Y-shaped strap member, the resistance plate member, the pair of securing strap attachment means connected to the upper horizontal rail and the adjusting means.

In still a further variant, as shown in FIG. 28, the means 74 for removably attaching the rigid frame 14 to the side 78 of the parental bed 42 includes a Y-shaped strap member 774. The strap member 774 has a leg end 778 and first 782 and second 786 arm ends. A resistance plate member 590 is provided. The resistance plate member 590 is located at the leg end 778 of the Y-shaped strap member 774. A pair of securing strap attachment means 598 is provided. The securing strap attachment means 598 are connected to the rigid frame 14 of the co-sleeper 10. Attachment cooperation means 602 are located at the first 782 and second 786 arm ends of the Y-shaped strap member 774 for reversible connection to the pair of securing strap attachment means 598.

Adjusting means 606 are provided for adjusting the length of the strap member 774 and tightening it after connecting the attachment cooperation means 602 to the pair of securing strap attachment means 598. The strap member 774 is properly positioned when located under the mattress 610 and above the surface 614 on which the mattress 610 rests and held in place by the resistance plate member 590 located vertically at the side 78 of the parental bed 42 opposite placement of the co-sleeper 10 and the adjusting means 606 is tightened so the co-sleeper 10 is held fast to the parental bed 42.

Figure 29:
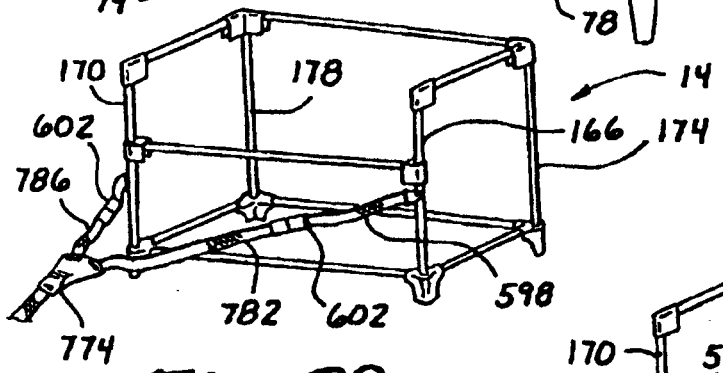
FIG. 29 is a perspective view of the FIG. 2 rigid frame illustrating the Y-shaped strap member and the securing strap attachment means connected to either of the front vertical rails.
Figure 30:
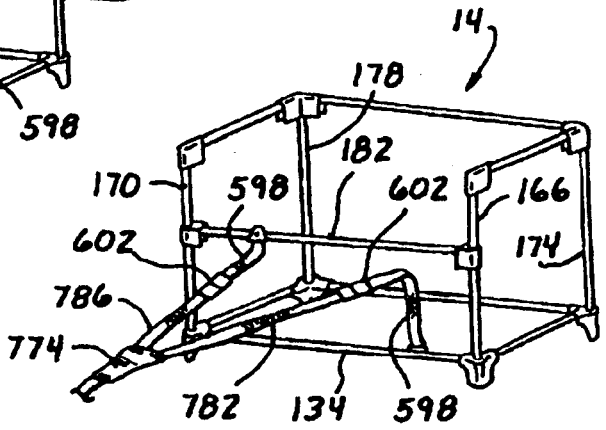
FIG. 30 is a perspective view of the FIG. 2 rigid frame illustrating the Y-shaped strap member and the securing strap attachment means connected to either of the front upper horizontal rail and the front lower horizontal rail.

In yet a further variant, as shown in FIG. 30, the securing strap attachment means 598 are connected to either of the front upper horizontal rail 182 and front lower horizontal rail 134. In still another variant of the invention, as shown in FIG. 29, the securing strap attachment means 598 are connected to either of the front 166, 170 and rear 174, 178 vertical rails.

Figure 31:
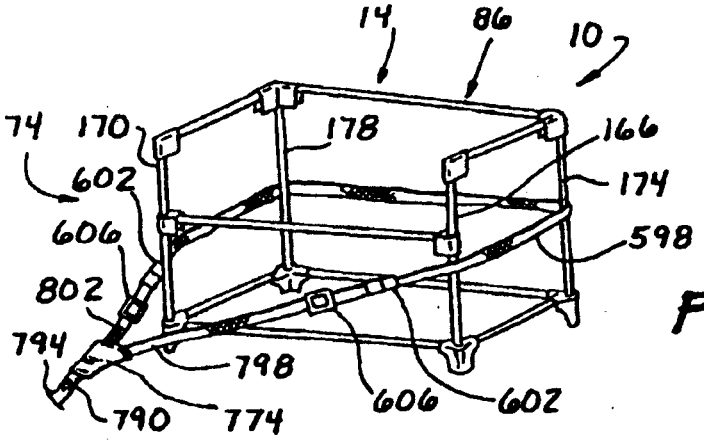
FIG. 31 is a perspective view of the FIG. 2 rigid frame illustrating the Y-shaped strap member and the scouring strap attachment means, the attachment cooperation means and the adjusting means.

In still a further variant, as shown in FIG. 31, the means 74 for removably attaching the rigid frame 14 to the side 78 of the parental bed 42 includes a Y-shaped strap member 790. The strap member 790 has a leg end 794 and first 798 and second 802 arm ends. A resistance plate member 590 is provided. The resistance plate member 590 is located at the leg end 794 of the Y-shaped strap member 790. A securing strap attachment means 598 is provided. The attachment means 598 is located at the first arm end 598 of the Y-shaped strap member 790. An attachment cooperation means 602 is located at the second arm end 802 of the Y-shaped strap member 790 for reversible connection to the securing strap attachment means 598.

Adjusting means 606 are provided for adjusting the length of the strap member 790 and tightening it after connecting the attachment cooperation means 602 to the securing strap attachment means 598. The strap member 806 is properly positioned when located under the mattress 610 and above the surface 614 on which the mattress 610 rests and held in place by the resistance plate member 590 located vertically at the side 78 of the parental bed 42 opposite placement of the co-sleeper 10 with the securing strap attachment means 598 connected to the attachment cooperation means 602 behind the back side element 86 of the rigid frame 14 and the adjusting means 606 tightened so the co-sleeper 10 is held fast to the parental bed 42.

Figure 32:
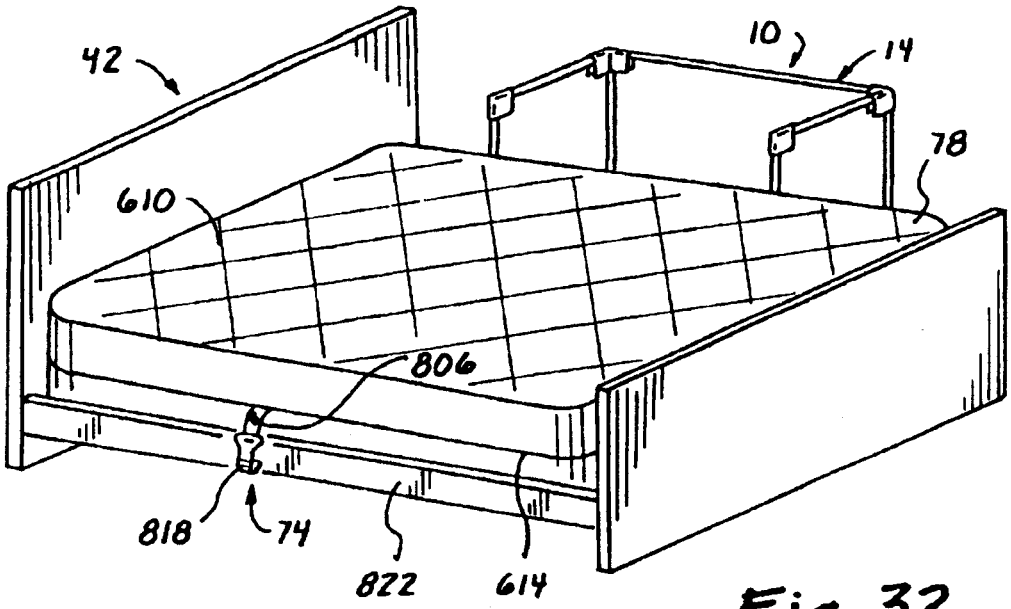
FIG. 32 is a perspective view of the means for removably attaching the rigid frame to the side of the parental bed illustrating the strap member, the hook member and the adjusting means.

In yet another variant of the invention, as shown in FIG. 32, the means 74 for removably attaching the rigid frame 14 to the side 78 of the parental bed 42 includes a strap member 806 having a first end (not shown) and a second end (not shown). A hook member 818 is slidably mounted to the strap member 806 such that the first end 810 and the second end 814 are equidistant from the hook member 818. A pair of securing strap attachment means 598 is provided. The securing strap attachment means 598 are connected to the rigid frame 14 of the co-sleeper 10. Attachment cooperation means 602 are located at the first end 810 and the second end 814 of the strap member 806 for reversible connection to the pair of securing strap attachment means 598.

Adjusting means 606 are provided for adjusting a length of the strap member 806 and tightening it after connecting the attachment cooperation means 602 to the pair of securing strap attachment means 598. The strap member 806 is properly positioned when located under the mattress 610 and above the surface 614 on which the mattress 610 rests and extended downwardly to a bed frame 822 and held in place by the hook member 818 attaching to the bed frame 822 at the side 78 of the parental bed 42 opposite placement of the co-sleeper 10 and the adjusting means 606 is tightened so the co-sleeper 10 is held fast to the parental bed 42.

Figure 33:
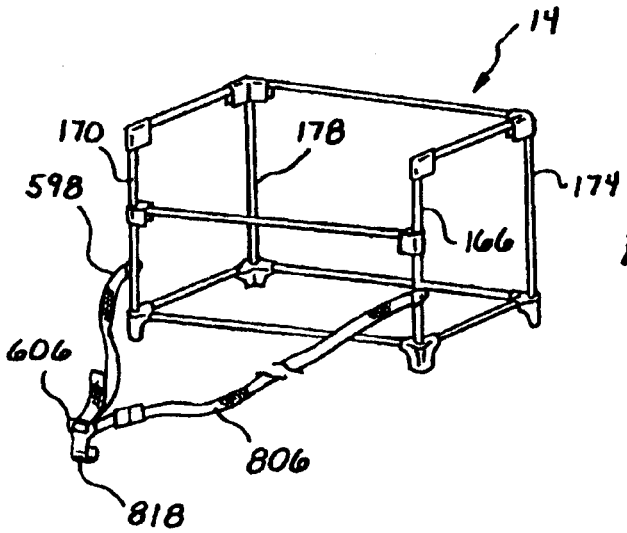
FIG. 33 is a perspective view of the FIG. 2 rigid frame illustrating the hook member and the securing strap attachment means connected to either of the front vertical rails.
Figure 34:
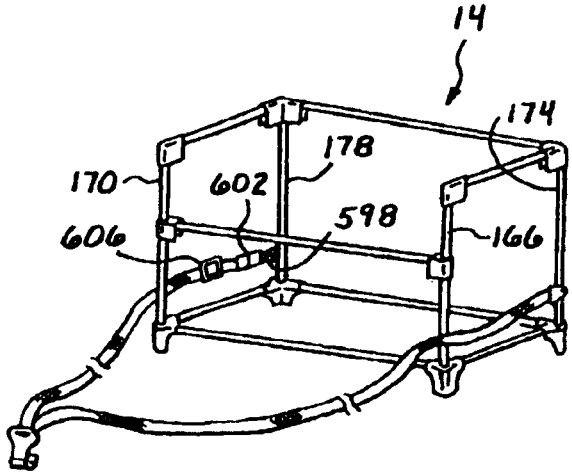
FIG. 34 is a perspective view of the FIG. 2 rigid frame illustrating the hook member and the securing strap attachment means connected to either of the rear vertical rails.

In yet a further variant (not shown), the securing strap attachment means 598 are connected to either of the front upper horizontal rail 182 and front lower horizontal rail 134. In still another variant, as shown in FIG. 33 and FIG. 34, the securing strap attachment means 598 are connected to either of the front 166, 170 and rear 174, 178 vertical rails.

In another variant of the invention, as shown in FIG. 35, the means 74 for removably attaching the rigid frame 14 to the side 78 of the parental bed 42 includes a Y-shaped strap member 826. The strap member 826 has a leg end 830 and first 834 and second 838 arm ends. A hook member 818 is provided. The hook member 818 located at the leg end 830 of the Y-shaped strap member 826. A pair of securing strap attachment means 598 is provided. The securing strap attachment means 598 are connected to the rigid frame 14 of the co-sleeper 10. Attachment cooperation means 602 are located at the first 834 and second 838 arm ends of the Y-shaped strap member 826 for reversible connection to the pair of securing strap attachment means 598.

Adjusting means 606 are provided for adjusting a length of the strap member 826 and tightening it after connecting the attachment cooperation means 602 to the pair of securing strap attachment means 598. The strap member 826 is properly positioned when located under the mattress 610 and above the surface 614 on which the mattress 610 rests and extended downwardly to the bed frame 822 and held in place by the hook member 818 attaching to the bed frame 822 at the side 580 of the parental bed 42 opposite placement of the co-sleeper 10 and the adjusting means 606 tightened so the co-sleeper 10 is held fast to the parental bed 42.

In still another variant, as shown in FIG. 36, the securing strap attachment means 598 are connected to either of the front upper horizontal rail 182 and front lower horizontal rail 134. In yet another variant, as shown in FIG. 37, the securing strap attachment means 598 are connected to either of the front 166, 170 and rear 174, 178 vertical rails.

In a further variant, as shown in FIG. 38, the means 74 for removably attaching the rigid frame 14 to the side 78 of the parental bed 42 includes a Y-shaped strap member 830. The strap member 830 has a leg end 834 and first 838 and second 842 arm ends. A hook member 818 is provided. The hook member 818 is located at the leg 834 end of the Y-shaped strap member 830. A securing strap attachment means 598 is provided. The attachment means 598 is located at the first arm end 838 of the Y-shaped strap member 830. An attachment cooperation means 602 is located at the second arm end 842 of the Y-shaped strap member 830 for reversible connection to the securing strap attachment means 598.

Adjusting means 606 are provided for adjusting a length of the strap member 830 and tightening it after connecting the attachment cooperation means 602 to the securing strap attachment means 598. The strap member 830 is properly positioned when located under the mattress 610 and above the surface 614 on which the mattress 610 rests and extended downwardly to the bed frame 822 and held in place by the hook member 818 attaching to the bed frame 822 at the side 580 of the parental bed 42 opposite placement of the co-sleeper 10 with the securing strap attachment means 598 connected to the attachment cooperation means 602 behind the back side element 86 of the rigid frame 14 and the adjusting means 606 tightened so the co-sleeper 10 is held fast to the parental bed 42.

In yet a further variant, as shown in FIG. 39, the means 74 for removably attaching the rigid frame 14 to the side 78 of the parental bed 42 includes first 846 and second 850 strap members. Each of the strap members 846, 850 has a first end (not shown) and a second end 858. A pair of securing strap attachment means 598 is provided. The securing strap attachment means 598 are connected to the rigid frame 14 of the co-sleeper 10. Attachment cooperation means 602 are located at the first ends of each of the first 846 and second 850 strap members for reversible connecting to the pair of securing strap attachment means 598. First 862 and second 866 resistance plate members are provided. Each of the resistance plate members 862, 866 is attached to the second end 858 of one of the first 846 and second 860 strap members.

Adjusting means 606 are provided for adjusting a length of the first 846 and second 850 strap members and tightening them after connecting the attachment cooperation means 602 to the pair of securing strap attachment means 598. The first 846 and second 850 strap members are properly positioned when located under the mattress 610 and above the surface 614 on which the mattress 610 rests and held in place by the first 862 and second 866 resistance plate members located vertically at the side 580 of the parental bed 42 opposite placement of the co-sleeper 10 and the adjusting means 606 tightened so the co-sleeper 10 is held fast to the parental bed 42.

Figure 40:
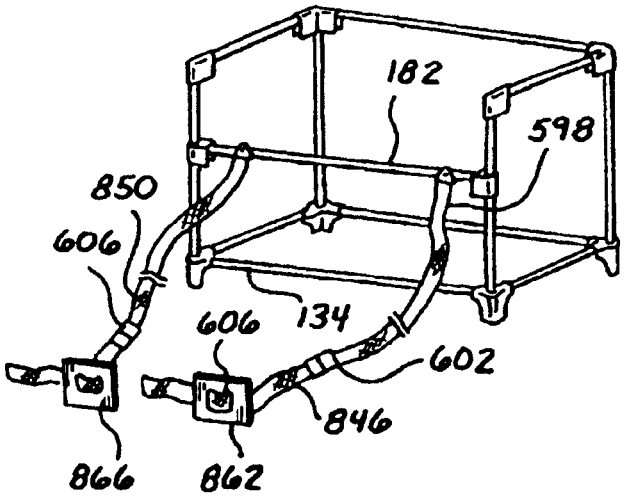
FIG. 40 is a perspective view of the FIG. 2 rigid frame illustrating the first and second resistance plate members, the adjusting means and the securing strap attachment means connected to the front upper horizontal rail.
Figure 41:
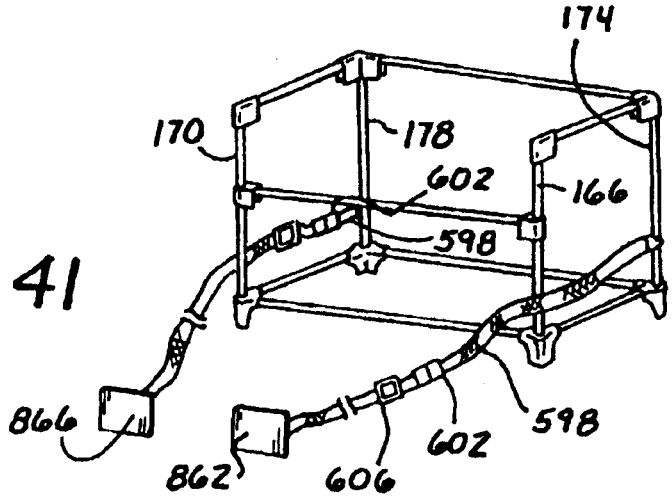
FIG. 41 is a perspective view of the FIG. 2 rigid frame illustrating the first and second resistance plate members, the adjusting means and the securing strap attachment means connected to either of the rear vertical rails.

In still a further variant of the invention, as shown in FIG. 40, the securing strap attachment means 598 are connected to either of the front upper horizontal rail 182 and front lower horizontal rail 134. In yet a further variant, as shown in FIG. 41, the securing strap attachment means 598 are connected to either of the front 166, 170 and rear 174, 178 vertical rails.

Figure 42:
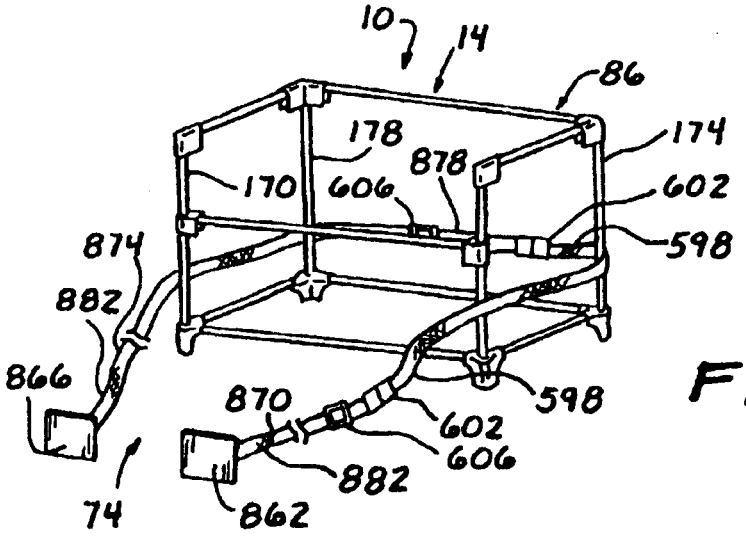
FIG. 42 is a perspective view of the FIG. 2 rigid frame illustrating the first and second resistance plate members, the first and second strap members, the adjusting means, the securing strap attachment means and the attachment cooperation means.

In still another variant, as shown in FIG. 42, the means 74 for removably attaching the rigid frame 14 to the side 78 of the parental bed 42 includes first 870 and second 874 strap members. Each of the strap members 870, 874 has a first end 878 and a second end 882. A securing strap attachment means 598 is located at the first end 878 of the first strap member 870. An attachment cooperation means 602 is located at the first end 878 of the second strap member 874 for reversible connection to the securing strap attachment means 598. First 862 and second 866 resistance plate members are provided. Each of the resistance plate members 862, 866 is attached to the second end 882 of one of the first 870 and second 874 strap members.

Adjusting means 606 are provided for adjusting a length of either of the first 870 and second 874 strap members and tightening it after connecting the attachment cooperation means 602 to the securing strap attachment means 598. The first 870 and second 874 strap members are properly positioned when located under the mattress 610 and above the surface 614 on which the mattress 610 rests and held in place by the first 862 and second 866 resistance plate members located vertically at the side 580 of the parental bed 42 opposite placement of the co-sleeper 10 with the securing strap attachment means 598 connected to the attachment cooperation means 602 behind the back side element 86 of the rigid frame 14 and the adjusting means 606 tightened so the co-sleeper 10 is held fast to the parental bed 42.

Figure 43:
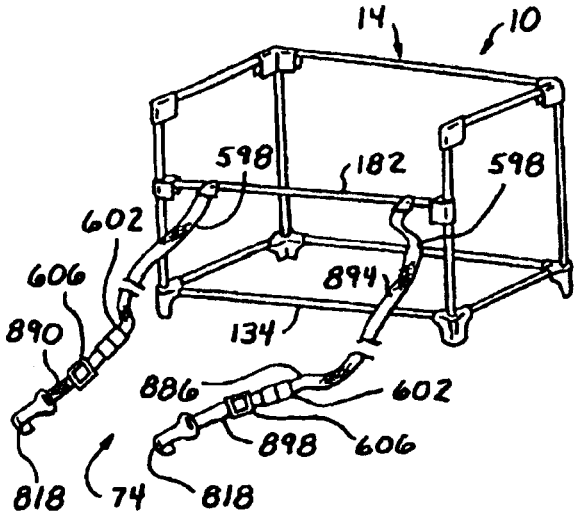
FIG. 43 is a perspective view of the FIG. 2 rigid frame illustrating the first and second strap members, the first and second hook members, the adjusting means and the securing strap attachment means connected to the upper horizontal rail.

In yet another variant, as shown in FIG. 43, the means 74 for removably attaching the rigid frame 14 to the side 78 of the parental bed 42 includes first 886 and second 890 strap members. Each of the strap members 886, 890 has a first end 894 and a second end 898. A pair of securing strap attachment means 598 is provided. The securing strap attachment means 598 is connected to the rigid frame 14 of the co-sleeper 10. Attachment cooperation means 602 are located at the first ends 894 of each of the first 886 and second 890 strap mem0bers for reversible connection to the pair of securing strap attachment means 598. First 818 and second 818 hook members are provided. Each of the hook members 818 is attached to the second end 898 of one of the first 886 and second 890 strap members.

Adjusting means 606 are provided for adjusting a length of the first 886 and second 890 strap members and tightening them after connecting the attachment cooperation means 602 to the pair of securing strap attachment means 598. The first 886 and second 890 strap members are properly positioned when located under the mattress 610 and above the surface 614 on which the mattress 610 rests and extended downwardly to a bed frame 822 and held in place by the first 818 and second 818 hook members attaching to the bed frame 822 at the side 580 of the parental bed 42 opposite placement of the co-sleeper 10 and the adjusting means 606 is tightened so the co-sleeper 10 is held fast to the parental bed 42.

Figure 44:
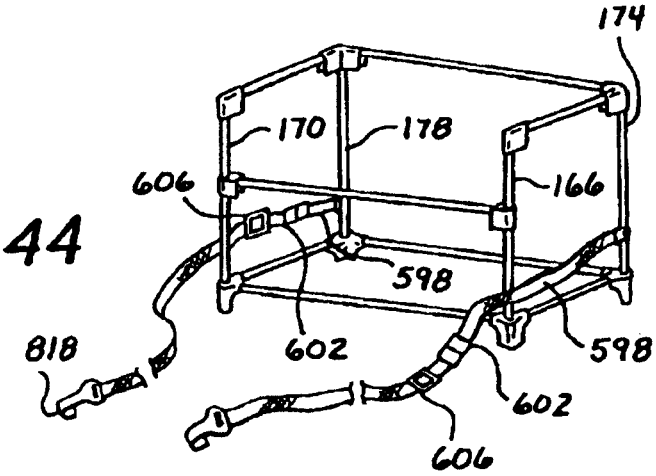
FIG. 44 is a perspective view of the FIG. 2 rigid frame illustrating the first and second strap members, the first and second hook members, the adjusting means and the securing strap attachment means connected to either of the rear vertical rails.

In yet a further variant, as shown in FIG. 43, the securing strap attachment means 598 are connected to either of the front upper horizontal rail 182 and front lower horizontal rail 134. In still a further variant, as shown in FIG. 44, the securing strap attachment means 598 are connected to either of the front 166, 170 and rear 174, 178 vertical rails.

Figure 45:
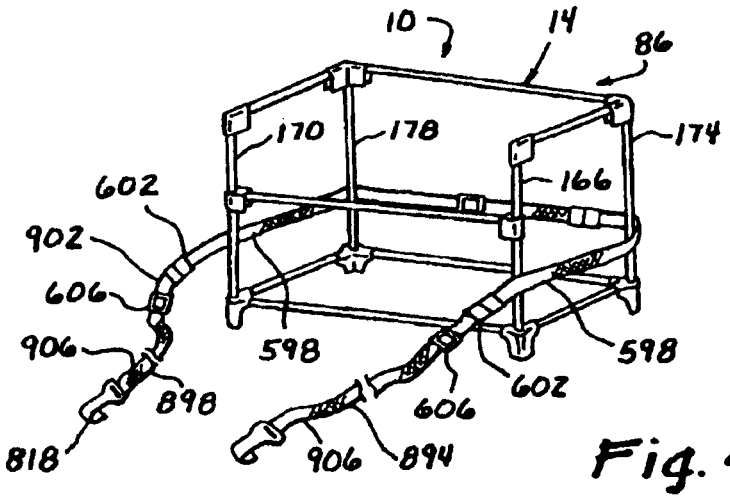
FIG. 45 is a perspective view of the FIG. 2 rigid frame illustrating the first and second strap members, the first and second hook members, the adjusting means, the securing strap attachment means and the attachment cooperation means.

In still another variant of the invention, as shown in FIG. 45, the means 74 for removably attaching the rigid frame 14 to the side 78 of the parental bed 42 includes first 894 and second 898 strap members. Each of the strap members 894, 898 has a first end 902 and a second end 906. A securing strap attachment means 598 is located at the first end 902 of the first strap member 894. An attachment cooperation means 602 is located at the first end 902 of the second strap member 898 for reversible connection to the securing strap attachment means 598. First 818 and second 818 hook members are provided. Each of the hook members 818 is attached to the second end 906 of one of the first 894 and second 898 strap members.

Adjusting means 606 are provided for adjusting a length of either of the first 894 and second 898 strap members and tightening them after connecting the attachment cooperation means 602 to the securing strap attachment means 598. The first 894 and second 898 strap members are properly positioned when located under the mattress 610 rests and extended downwardly to a bed frame 822 and held in place by the first 818 and second 818 hook members attaching to the bed frame 822 at the side 580 of the parental bed 42 opposite placement of the co-sleeper 10 with the securing strap attachment means 598 connected to the attachment cooperation means 602 behind the back side element 86 of the rigid frame 14 and the adjusting means 606 tightened so the co-sleeper 10 is held fast to the parental bed 42.

In a further variant, the adjusting means 606 is disposed at a point on the strap member 578 adjacent the resistance plate member 590. In still a further variant, the adjusting means 606 is disposed at the leg end 778 of the Y-shaped strap member 774 adjacent the resistance plate member 590. In yet a further variant of the invention, the adjusting means 606 is disposed at a point on the strap member 806 adjacent the hook member 818. In another variant, the adjusting means 606 is disposed at the leg end 830 of the Y-shaped strap member 826 adjacent the hook member 818. In still another variant, the adjusting means 606 are disposed at points on the first 846 and second 850 strap member adjacent the first 862 and second 866 resistance plate members. In a final variant of the invention, the adjusting means 606 are disposed at points on the first 886 and second 890 strap member adjacent the first 818 and second 818 hook members.

The combination co-sleeper and changing table 10 has been described with reference particular embodiments. Other modifications and enhancements can be made without departing from the spirit and scope of the claims that follow.

What is claimed is:

1. A co-sleeper convertibly adapted for use as a changing table comprising:

a rigid frame, said frame providing means for attaching a support platform at a first predetermined height;

said first predetermined height being less than a height of a top surface of a mattress of a parental bed;

an enclosure, said enclosure having an open top, a surrounding wall and a floor, said floor having an upper surface and a lower surface;

said enclosure being sized and shaped to fit removably over said rigid frame with the lower surface of the floor disposed upon the support platform;

a mattress pad, said mattress pad being sized and shaped to fit slidably within the enclosure; and means for removably attaching the rigid frame to a side of the parental bed.

2. A co-sleeper convertibly adapted for use as a changing table as described in claim 1, wherein:

the rigid frame includes a front side element, a back side element, a first side element and a second side element;

the rigid frame being formed at a top by a rear upper horizontal rail and first and second upper side parallel horizontal rails and two upper front corner members and two upper rear corner members in cooperation therewith, and being formed adjacent a floor by front and rear lower parallel horizontal rails and first side and second side lower parallel horizontal rails and four lower corner leg members in cooperation therewith, and a pair of front vertical rails and a pair of rear vertical rails in further cooperation with the two upper front corner members and the two upper rear corner members and the four lower corner leg members, and a front upper horizontal rail in cooperation with said front vertical rails, said front upper horizontal rail having a first end and a second end;

said rear upper horizontal rail and first and second upper side parallel horizontal rails being disposed at a second predetermined height and said front upper horizontal rail being disposed at a third, lower predetermined height; and said third predetermined height being greater than said first predetermined height and said second predetermined height being greater than said third predetermined height.

3. A co-sleeper convertibly adapted for use as a changing table as described in claim 2, wherein the support platform comprises:

first and second intermediate side parallel horizontal rails and first and second horizontal support rails;

said first and second intermediate side parallel horizontal rails having first and second ends, a mid point and being removably connected at said first and second ends to the front and rear vertical rails of the first and second side elements, respectively; and said first and second horizontal support rails having first and second ends, a mid point and being removably connected at said first and second ends to the first and second intermediate side parallel horizontal rails.

4. A co-sleeper convertibly adapted for use as a changing table as described in claim 2, wherein the support platform comprises:

first, second, third and fourth support hangers, each of said support hangers having a first end, a second end, an inner side and an outer side and having a curved hooking portion disposed at said first end;

said hooking portion being sized and shaped to fit frictionally over the rigid frame and one of the first and second upper side horizontal rails;

each of said support hangers further including at least two circular orifices, said orifices extending from the inner side to the outer side of said hangers, at least two spring button housings, said housings disposed upon the outer sides of said support hangers adjacent said orifices, each of said spring button housings including a finger opening;

two support rods, each of said rods having a first end and a second end and being sized and shaped to extend between one of the first and second support hangers and one of the third and fourth support hangers when said support hangers are disposed upon one of the first and second upper side horizontal rails, each of said support rods having a spring button mounted at the first end and the second end, said spring button being sized and shaped to engage said spring button housing;

whereby, when the first and second ends of the support rods are introduced into the orifices of the support hangers, and the support hangers are disposed upon one of the first and second upper side horizontal rails, the spring buttons will removably engage the spring button housings of the hangers, thereby providing a support platform for the enclosure.

5. A co-sleeper convertibly adapted for use as a changing table as described in claim 4, wherein the enclosure further comprises at least one tie down strap, said strap being fixedly attached to a lower portion of the enclosure and serving to secure the enclosure to the rigid frame so as to prevent the enclosure from rocking on the support hangers.

6. A co-sleeper convertibly adapted for use as a changing table as described in claim 2, wherein the support platform comprises:

a series of rigid floor panels, said floor panels being sized and shaped to fit within dimensions of the floor of the enclosure;

a series of panel pockets, said panel pockets having an upper surface and a lower surface and being fixedly attached at their upper surfaces to the lower surface of the enclosure and being sized and shaped to removably enclose said rigid floor panels;

a series of support bars, said bars being sized and shaped to fit within dimensions of the floor of the enclosure;

a series of bar pockets, said bar pockets having an upper surface and a lower surface and being fixedly attached at their upper surfaces to the lower surface of the panel packets and being sized and shaped to removably enclose said support bars; and whereby, when said rigid floor panels are inserted into said panel pockets, said support bars are inserted into said bar pockets and said enclosure is installed on said rigid frame, the enclosure will include a support platform maintained at said first predetermined height.

7. A co-sleeper convertibly adapted for use as a changing table as described in claim 2, further comprising:

means for pivotally mounting the front upper horizontal rail to the front vertical rails;

means for pivotally mounting the rear upper horizontal rail to the upper rear corner members;

a frame locking device positioned at center points of the front and rear upper horizontal rails pivotally mounted thereto and permitting said front and rear upper rail to pivot downwardly from an open top of the frame;

means for pivotally mounting the first and second upper side horizontal rails to the upper front and rear corner members;

frame locking devices positioned at center points of the first and second upper side horizontal rails being pivotally mounted thereto and permitting each of said rails to pivot downwardly from the open top of the frame;

means for pivotally mounting the first and second lower side horizontal rails to the lower front and rear corner members;

frame locking devices positioned at center points of the first and second side lower horizontal rails being pivotally mounted thereto and permitting each of said rails to pivot upwardly;

means for pivotally mounting the front and rear lower horizontal rails to the lower front and rear corner members, respectively; and frame locking devices positioned at center points of the front and rear lower horizontal rails being pivotally mounted thereto and permitting each of said rails to pivot upwardly;

whereby, said frame may be quickly folded into a compact package for transport and storage by releasing the frame locking devices and depressing the upper horizontal rails downwardly while pulling upwardly on the lower horizontal rails, thereby causing the upper horizontal rails to bend downwardly and the lower horizontal rails to bend upwardly and the vertical rails to move inwardly.

8. A co-sleeper convertibly adapted for use as a changing table as described in claim 3, wherein the means for removably connecting the first and second intermediate side parallel horizontal rails to the front and rear vertical rails of the first and second side elements and the first and second horizontal support rails to the first and second intermediate side parallel horizontal rails comprises:

a plurality of coupling units, said coupling units being mounted to each of the first and second ends of the intermediate side parallel horizontal rails, the first and second horizontal support rails and front upper horizontal rail;

said coupling units including a T-shaped protrusion orthogonal to the rails and extending from a lower end of the coupling unit to an upper end of the coupling unit and terminating in a stop;

a resilient securing tab disposed on the coupling unit below the T-shaped protrusion, said securing tab including a locking projection spaced downwardly from a lower end of said T-shaped protrusion and extending outwardly from said securing tab, said locking projection having a flattened upper surface orthogonal to said securing tab;

a plurality of receiving units, said receiving units being mounted to each of the front and rear vertical rails and the intermediate side parallel horizontal rails;

said receiving units having a mating T-shaped slot extending from an upper end of the receiving unit to a lower end of the receiving unit, said slot terminating in a closed end, said closed end having a flattened lower surface;

said receiving units being sized shaped and disposed to removably secure said coupling units with said locking projection removably engaging the flattened lower surface of the closed end of the mating T-shaped slot when the T-shaped protrusion of the coupling unit is seated in the T-shaped slot of the receiving unit; and whereby when said coupling units are removably attached to said receiving units, the first and second ends of the intermediate side parallel horizontal rails and the front upper horizontal rail will be removably connected to the front and rear vertical rails and the first and second horizontal support rails will be removably connected to the intermediate side parallel horizontal rails.

9. A co-sleeper convertibly adapted for use as a changing table as described in claim 2, wherein the enclosure further comprises:

a back wall, a front wall and first and second side walls;

said back wall, first and second side walls extending from the floor to at least a height of the rear upper horizontal rail and first and second upper side parallel horizontal rails;

said front wall extending from the floor to at least a height of the front upper horizontal rail;

each of said walls having a padded inner layer, said inner layer disposed between the front side element, back side element, first side element and second side element;

each of said walls having an outer layer, said outer layer extending outwardly from the rigid frame;

said padded inner layers and said outer layers being joined along upper edges and outer corners to form a pocket enclosing the front and rear upper horizontal rail and first and second upper side parallel horizontal rails and upper portions of the front and rear vertical rails; and at least one tie down, said tie down being fixedly attached at a lower corner of the enclosure for removably securing the enclosure to the rigid frame.

10. A co-sleeper convertibly adapted for use as a changing table as described in claim 2, wherein the enclosure further comprises:

a back wall, a front wall and first and second side walls;

said back wall, first and second side walls extending from the floor to at least the height of the rear upper horizontal rail and first and second upper side parallel horizontal rails;

said front wall extending from the floor to at least the height of the front upper horizontal rail;

each of said walls having a padded inner layer, said inner layer having an inner surface and an outer surface and being disposed between the front side element, back side element, first side element and second side element;

each of said walls having an outer layer, said outer layer having an inner surface and an outer surface and extending outwardly from the rigid frame;

said padded inner layers and said outer layers being joined along upper edges forming a series of exterior flaps extending downwardly from the front and rear upper horizontal rails and first and second upper side parallel horizontal rails; and means for removably attaching the outer surfaces of the padded inner layers to the inner surfaces of the outer layers to secure the enclosure to the rigid frame.

11. A co-sleeper convertibly adapted for use as a changing table as described in claim 9, wherein the enclosure further comprises:

a series of rigid panels, said panels being sized and shaped to provide structural support for the back wall, front wall and first and second side walls of the enclosure;

a series of pockets, said pockets being disposed upon an outer surface of the padded inner layers of said walls and being sized and shaped to removably enclose said rigid panels;

a series of openings in the outer layers of the walls for accessing the pockets; and whereby when the rigid panels are installed in the pockets, an occupant of the enclosure will not be able to push the walls outwardly beyond the rigid frame to produce an entrapping fold.

12. A co-sleeper convertibly adapted for use as a changing table as described in claim 10, wherein the enclosure further comprises:

a series of rigid panels, said panels being sized and shaped to provide structural support for the back wall, front wall and first and second side walls of the enclosure;

a series of pockets, said pockets being disposed upon the outer surface of the padded inner layers of said walls and being sized and shaped to removably enclose said rigid panels; and whereby when the rigid panels are installed in the pockets, an occupant of the enclosure will not be able to push the walls outwardly beyond the rigid frame to produce an entrapping fold.

13. A co-sleeper convertibly adapted for use as a changing table as described in claim 9, wherein the enclosure further comprises:

a series of mesh panels, said mesh panels being disposed along lower portions of the padded inner layers of the walls; and whereby said mesh panels will provide additional breathing capability for an occupant of the enclosure that becomes trapped against one of the walls.

14. A co-sleeper convertibly adapted for use as a changing table as described in claim 10, wherein the enclosure further comprises:

a series of mesh panels, said mesh panels being disposed along lower portions of the padded inner layers of the walls; and whereby said mesh panels will provide additional breathing capability for and occupant of the enclosure that becomes trapped against one of the walls.

15. A co-sleeper convertibly adapted for use as a changing table as described in claim 1 wherein the means for removably attaching the rigid frame to the side of the parental bed further comprises:

a strap member having a first and a second end;

a resistance plate member having at least two slots vertically aligned and centrally disposed at which the strap member is attached such that the first end and the second end are equidistant from the plate member;

a pair of securing strap attachment means, said securing strap attachment means being connected to either of the front and rear vertical rails of the rigid frame;

attachment cooperation means disposed at the first end and the second end of the strap member for reversible connection to the pair of securing strap attachment means; and adjusting means for adjusting a length of the strap member and tightening same after connecting the attachment cooperation means to the pair of securing strap attachment means;

wherein, the strap member is properly positioned when disposed under a mattress and above a surface on which said mattress rests and held in place by the resistance plate member disposed vertically at the side of the parental bed opposite placement of the co-sleeper and the adjusting means is tightened so the co-sleeper is held fast to the parental bed.

16. A co-sleeper convertibly adapted for use as a changing table as described in claim 1, wherein the mattress pad has a top surface and a bottom surface and is covered with a washable fabric and padded on its top surface.

17. A co-sleeper convertibly adapted for use as a changing table as described in claim 16, wherein the mattress pad is segmented into at least four segments closely aligned, is capable of being folded, said mattress pad serving as an enclosure for the co-sleeper when folded for transport and storage.

18. A co-sleeper convertibly adapted for use as a changing table as described in claim 17, wherein the mattress pad further comprises at least one pair of reversibly separable attachment means and the enclosure comprises a series of opening sized shaped and disposed to permit the attachment means to secure the mattress pad to the support platform.

19. A convertible playpen configured as a co-sleeper as described in claim 18, wherein the mattress pad further comprises at least one pair of reversibly separable attachment means and the enclosure further comprises a series of openings sized shaped and disposed to permit the attachment means to secure the mattress pad to the rigid frame.

20. A co-sleeper convertibly adapted for use as a changing table as described in claim 7, wherein the rigid frame is formed of hollow tubing, the horizontal rails each have a first portion and a second portion, each portion having an inboard end and an outboard end, and the frame locking devices positioned at center points of said rails further comprise:

a connecting frame, said frame pivotally mounted to the inboard ends of each of the first and second portions of said horizontal rails;

said connecting frame including a pair of locking holes;

a pair of spring-loaded buttons mounted within said horizontal rails, said buttons being sized, shaped and disposed to engage the locking holes in the connecting frame when the first and second portions of said rails are collinear; and means for pushing both buttons inwardly so as to clear the locking holes in the connecting frame simultaneously, thereby permitting the horizontal rails to be pivoted.

21. A co-sleeper convertibly adapted for use as a changing table as described in claim 20, further comprising:

means for locking the spring-loaded buttons within the horizontal rails so as to clear the locking holes in the connecting frame after pushing the buttons inwardly when the first and second portions of said rails are collinear, thereby permitting easy folding of the rigid frame; and means for unlocking the spring-loaded buttons upon folding of the rigid frame, thereby permitting the buttons to lock into the connecting frame when the rigid frame is unfolded.

22. A co-sleeper convertibly adapted for use as a changing table as described in claim 7, wherein the rigid frame is formed of hollow tubing, the horizontal rails each have a first portion and a second portion, each portion having an inboard end an outboard end, and the frame locking devices positioned at center points of said rails further comprise:

an outer connecting housing, said connecting housing formed of rigid material and being pivotally mounted to the inboard ends of each of the first and second portions of said horizontal rails;

an inner spring housing, said spring housing being pivotally mounted to the inboard ends of each of the first and second portions of said horizontal rails such that said pivotal mountings are collinear with the mountings of the outer connecting housing; and said inner spring housing being disposed within the outer connecting housing and being sized, shaped and disposed to fit frictionally about the inboard ends of each of the first and second portions of said rails and capable of expanding within said outer connecting housing to permit pivoting of said inboard ends when the rigid frame is folded, thereby providing a means of locking said inboard ends in collinear alignment when the rigid frame is unfolded.

23. A co-sleeper convertibly adapted for use as a changing table as described in claim 7, wherein the rigid frame is formed of hollow tubing, the horizontal rails each have a first portion and a second portion, each portion having an inboard end and an outboard end, and the frame locking devices positioned at center points of said rails further comprise:

a spring housing, said spring housing being pivotally mounted upon a pair of mounting pins to the inboard ends of each of the first and second portions of said horizontal rails;

said spring housing including first and second pairs of arcurate alignment slots and first and second pairs of positioning detents;

first and second alignment pins, said pins being mounted parallel to said mounting pins and spaced outwardly from the inboard ends of the first and second portions of said horizontal rails;

said alignment pins being sized, shaped and disposed to fit slidably within said arcurate alignment slots;

each of said pairs of positioning detents spaced apart by a distance slightly greater than a diameter of one of the horizontal rails; and whereby, when the first and second portions of said horizontal rails are collinear, said rails will be within said spring housing and when said rails are pivoted with respect to one another to fold the rigid frame, the detents will be urged against the rails by the spring resistance of the housing, causing the housing to spread apart, such resistance serving to maintain the collinear alignment of the rails when the rigid frame is erected.

24. A co-sleeper convertibly adapted for use as a changing table as described in claim 2, further comprising height adjusting extensions cooperating with each of the four lower corner leg members.

25. A co-sleeper convertibly adapted for use as a changing table as described in claim 2 wherein the means for removably attaching the rigid frame to the side of the parental bed further comprises:

a strap member having a first end and a second end;

a pair of securing strap attachment means, said securing strap attachment means being connected to the rigid frame of the co-sleeper;

attachment cooperation means disposed at the first end and the second end of the strap member for reversible connection to the pair of securing strap attachment means; and adjusting means for adjusting a length of the strap member and tightening same after connecting the attachment cooperation means to the pair of securing strap attachment means;

wherein, the strap member is properly positioned when connected to one of the strap attachment means and extended over a top surface of a mattress, down a back side of the mattress and underneath the mattress and connected to the other strap attachment means, the adjusting means being tightened to prevent movement of the co-sleeper with respect to the parental bed.

26. A co-sleeper convertibly adapted for use as a changing table as described in claim 25 wherein the securing strap attachment means are connected to either of the front upper horizontal rail and front lower horizontal rail.

27. A co-sleeper convertibly adapted for use as a changing table as described in claim 25 wherein the securing strap attachment means are connected to either of the front and rear vertical rails.

28. A co-sleeper convertibly adapted for use as a changing table as described in claim 2 wherein the means for removably attaching the rigid frame to the side of the parental bed further comprises:

a strap member having a first end and a second end;

a securing strap attachment means, said securing strap attachment means being disposed at the first end of the strap member;

an attachment cooperation means disposed at the second end of the strap member for reversible connection to the securing strap attachment means; and adjusting means for adjusting a length of the strap member and tightening same after connecting the attachment cooperation means to the securing strap attachment means;

wherein, the strap member is properly positioned when extended over the top surface of a mattress, down the back side of the mattress and underneath the mattress, terminating behind the back side element with the securing strap attachment means connected to the attachment cooperation means, the adjusting means being tightened to prevent movement of the co-sleeper with respect to the parental bed.

29. A co-sleeper convertibly adapted for use as a changing table as described in claim 2 wherein the means for removably attaching the rigid frame to the side of the parental bed further comprises:

a Y-shaped strap member, said strap member having a leg end and first and second arm ends;

a resistance plate member, said resistance plate member disposed at the leg end of the Y-shaped strap member;

a pair of securing strap attachment means, said securing strap attachment means being connected to the rigid frame of the co-sleeper;

attachment cooperation means disposed at the first and second arm ends of the Y-shaped strap member for reversible connection to the pair of securing strap attachment means;

adjusting means for adjusting a length of the strap member and tightening same after connecting the attachment cooperation means to the pair of securing strap attachment means; and wherein, the strap member is properly positioned when disposed under a mattress and above a surface on which said mattress rests and held in place by the resistance plate member disposed vertically at a side of the parental bed opposite placement of the co-sleeper and the adjusting means tightened so the co-sleeper is held fast to the parental bed.

30. A co-sleeper convertibly adapted for use as a changing table as described in claim 29 wherein the securing strap attachment means are connected to either of the front upper horizontal rail and front lower horizontal rail.

31. A co-sleeper convertibly adapted for use as a changing table as described in claim 29 wherein the securing strap attachment means are connected to either of the front and rear vertical rails.

32. A co-sleeper convertibly adapted for use as a changing table as described in claim 2 wherein the means for removably attaching the rigid frame to the side of the parental bed further comprises:

a Y-shaped strap member, said strap member having a leg end and first and second arm ends;

a resistance plate member, said resistance plate member disposed at the leg end of the Y-shaped strap member;

a securing strap attachment means, said attachment means disposed at the first arm end of the Y-shaped strap member;

an attachment cooperation means disposed at the second and end of the Y-shaped strap member for reversible connection to the securing strap attachment means;

adjusting means for adjusting a length of the strap member and tightening same after connecting the attachment cooperation means to the securing strap attachment means; and wherein, the strap member is properly positioned when disposed under a mattress and above a surface on which said mattress rests and held in place by the resistance plate member disposed vertically at a side of the parental bed opposite placement of the co-sleeper, the securing strap attachment means connected to the attachment cooperation means behind the back side element of the rigid frame and the adjusting means tightened so the co-sleeper is held fast to the parental bed.

33. A co-sleeper convertibly adapted for use as a changing table as described in claim 2 wherein the means for removably attaching the rigid frame to the side of the parental bed further comprises:

a strap member having a first end and a second end;

a hook member, said hook member being slidably mounted to the strap member such that the first end and the second end are equidistant from the hook member;

a pair of securing strap attachment means, said securing strap attachment means being connected to the rigid frame of the co-sleeper;

attachment cooperation means disposed at the first end and the second end of the strap member for reversible connection to the pair of securing strap attachment means; and adjusting means for adjusting a length of the strap member and tightening same after connecting the attachment cooperation means to the pair of securing strap attachment means;

wherein, the strap member is properly positioned when disposed under a mattress and above a surface on which said mattress rests and extending downwardly to a bed frame and held in place by the hook member attaching to said bed frame, at a side of the parental bed opposite placement of the co-sleeper and the adjusting means is tightened so the co-sleeper is held fast to the parental bed.

34. A co-sleeper convertibly adapted for use as a changing table as described in claim 33 wherein the securing strap attachment means are connected to either of the front upper horizontal rail and front lower horizontal rail.

35. A co-sleeper convertibly adapted for use as a changing table as described in claim 33 wherein the securing strap attachment means are connected to either of the front and rear vertical rails.

36. A co-sleeper convertibly adapted for use as a changing table as described in claim 2 wherein the means for removably attaching the rigid frame to the side of the parental bed further comprises:

a Y-shaped strap member, said strap member having a leg end and first and second arm ends;

a hook member, said hook member disposed at the leg end of the Y-shaped strap member;

a pair of securing strap attachment means, said securing strap attachment means being connected to the rigid frame of the co-sleeper;

attachment cooperation means disposed at the first and second arm ends of the Y-shaped strap member for reversible connection to the pair of securing strap attachment means;

adjusting means for adjusting a length of the strap member and tightening same after connecting the attachment cooperation means to the pair of securing strap attachment means; and wherein, the strap member is properly positioned when disposed under a mattress and above a surface on which said mattress rests and extending downwardly to a bed frame and held in place by the hook member attaching to said bed frame at the side of the parental bed opposite placement of the co-sleeper and the adjusting means tightened so the co-sleeper is held fast to the parental bed.

37. A co-sleeper convertibly adapted for use as a changing table as described in claim 36 wherein the securing strap attachment means are connected to either of the front upper horizontal rail and front lower horizontal rail.

38. A co-sleeper convertibly adapted for use as a changing table as described in claim 36 wherein the securing strap attachment means are connected to either of the front and rear vertical rails.

39. A co-sleeper convertibly adapted for use as a changing table as described in claim 2 wherein the means for removably attaching the rigid frame to the side of the parental bed further comprises:

a Y-shaped strap member, said strap member having a leg end and first and second arm ends;

a hook member, said hook member disposed at the leg end of the Y-shaped strap member;

a securing strap attachment means, said attachment means disposed at the first arm end of the Y-shaped strap member;

an attachment cooperation means disposed at the second arm end of the Y-shaped strap member for reversible connection to the securing strap attachment means;

adjusting means for adjusting a length of the strap member and tightening same after connecting the attachment cooperation means to the securing strap attachment means; and wherein, the strap member is properly positioned when disposed under a mattress and above a surface on which said mattress rests and extending downwardly to a bed frame and held in place by the hook member attaching to said bed frame at the side of the parental bed opposite placement of the co-sleeper, the securing strap attachment means connected to the attachment cooperation means behind the back side element of the rigid frame and the adjusting means tightened so the co-sleeper is held fast to the parental bed.

40. A co-sleeper convertibly adapted for use as a changing table as described in claim 2 wherein the means for removably attaching the rigid frame to the side of the parental bed further comprises:

first and second strap members, each of said strap members having a first end and a second end;

a pair of securing strap attachment means, said securing strap attachment means being connected to the rigid frame of the co-sleeper;

attachment cooperation means disposed at the first ends of each of the first and second strap members for reversible connection to the pair of securing strap attachment means;

first and second resistance plate members, each of said resistance plate members attached to the second end of one of the first and second strap members;

adjusting means for adjusting a length of the first and second strap members and tightening same after connecting the attachment cooperation means to the pair of securing strap attachment means;

wherein, the first and second strap members are properly positioned when disposed under a mattress and above a surface on which said mattress rests and held in place by the first and second resistance plate members disposed vertically at a side of the parental bed opposite placement of the co-sleeper and the adjusting means is tightened so the co-sleeper is held fast to the parental bed.

41. A co-sleeper convertibly adapted for use as a changing table as described in claim 40 wherein the securing strap attachment means are connected to either of the front upper horizontal rail and front lower horizontal rail.

42. A co-sleeper convertibly adapted for use as a changing table as described in claim 40 wherein the securing strap attachment means are connected to either of the front and rear vertical rails.

43. A co-sleeper convertibly adapted for use as a changing table as described in claim 2 wherein the means for removably attaching the rigid frame to the side of the parental bed further comprises:

first and second strap members, each of said strap members having a first end and a second end;

a securing strap attachment means, said securing strap attachment means disposed at the first end of the first strap member;

an attachment cooperation means disposed at the first end of the second strap member for reversible connection to the securing strap attachment means;

first and second resistance plate members, each of said resistance plate members attached to the second end of one of the first and second strap members;

adjusting means for adjusting a length of either of the first and second strap members and tightening same after connecting the attachment cooperation means to the securing strap attachment means;

wherein, the first and second strap members are properly positioned when disposed under a mattress and above a surface on which said mattress rests and held in place by the first and second resistance plate members disposed vertically at a side of the parental bed opposite placement of the co-sleeper, the securing strap attachment means connected to the attachment cooperation means behind the back side element of the rigid frame and the adjusting means tightened so the co-sleeper is held fast to the parental bed.

44. A co-sleeper convertibly adapted for use as a changing table as described in claim 2 wherein the means for removably attaching the rigid frame to the side of the parental bed further comprises:

first and second strap members, each of said strap members having a first end and a second end;

a pair of securing strap attachment means, said securing strap attachment means being connected to the rigid frame of the co-sleeper;

attachment cooperation means disposed at the first ends of each of the first and second strap members for reversible connection to the pair of securing strap attachment means;

first and second hook members, each of said hook members attached to the second end of one of the first and second strap members;

adjusting means for adjusting a length of the first and second strap members and tightening same after connecting the attachment cooperation means to the pair of securing strap attachment means;

wherein, the first and second strap members are properly positioned when disposed under a mattress and above a surface on which said mattress rests and extending downwardly to a bed frame and held in place by the first and second hook members attaching to said bed frame at the side of the parental bed opposite placement of the co-sleeper and the adjusting means is tightened so the co-sleeper is held fast to the parental bed.

45. A co-sleeper convertibly adapted for use as a changing table as described in claim 43 wherein the securing strap attachment means are connected to either of the front upper horizontal rail and front lower horizontal rail.

46. A co-sleeper convertibly adapted for use as a changing table as described in claim 43 wherein the securing strap attachment means are connected to either of the front and rear vertical rails.

47. A co-sleeper convertibly adapted for use as a changing table as described in claim 2 wherein the means for removably attaching the rigid frame to the side of the parental bed further comprises:

first and second strap members, each of said strap members having a first end and a second end;

a securing strap attachment means, said securing strap attachment means disposed at the first end of the first strap member;

an attachment cooperation means disposed at the first end of the second strap member for reversible connection to the securing strap attachment means;

first and second hook members, each of said hook members attached to the second end of one of the first and second strap members;

adjusting means for adjusting a length of either of the first and second strap members and tightening same after connecting the attachment cooperation means to the securing strap attachment means;

wherein, the first and second strap members are properly positioned when disposed under a mattress and above a surface on which said mattress rests and extending downwardly to a bed frame and held in place by the first and second hook members attaching to said bed frame at a side of the parental bed opposite placement of the co-sleeper, the securing strap attachment means connected to the attachment cooperation means behind the back side element of the rigid frame and the adjusting means tightened so the co-sleeper is held fast to the parental bed.

48. A co-sleeper convertibly adapted for use as a changing table as described in claim 15 wherein the adjusting means is disposed at a point on the strap member adjacent the resistance plate member.

49. A co-sleeper convertibly adapted for use as a changing table as described in claims 29, 30, 31 or 32 wherein the adjusting means is disposed at the leg end of the Y-shaped strap member adjacent the resistance plate member.

50. A co-sleeper convertibly adapted for use as a changing table as described in claims 33, 34, or 35 wherein the adjusting means is disposed at a point on the strap member adjacent the hook member.

51. A co-sleeper convertibly adapted for use as a changing table as described in claims 36, 37, 38 or 39 wherein the adjusting means is disposed at the leg end of the Y-shaped strap member adjacent the hook member.

52. A co-sleeper convertibly adapted for use as a changing table as described in claims 40, 41, 42 or 43 wherein the adjusting means are disposed at points on the first and second strap member adjacent the first and second resistance plate members.

53. A co-sleeper convertibly adapted for use as a changing table as described in claims 44, 45, 46 or 47 wherein the adjusting means are disposed at points on the first and second strap member adjacent the first and second hook members.

* * * * *

US00RE39136C1

(12) EX PARTE REEXAMINATION CERTIFICATE (7551st)

United States Patent

Tharalson et al.

(10) Number: US RE39,136 C1

(45) Certificate Issued: Jun. 8, 2010

(54) COMBINATION CO-SLEEPER AND CHANGING TABLE

(75) Inventors: Douglas Tharalson, Agoura, CA (US); Diana Tharalson, Agoura, CA (US); Bruce Martin, Malibu, CA (US)

(73) Assignee: Arms Reach Concepts, Inc., Malibu, CA (US)

Reexamination Request:
No. 90/008,020, Apr. 26, 2006

Reexamination Certificate for:

| | |
|---|---|
| Patent No.: | **Re. 39,136** |
| Issued: | **Jun. 20, 2006** |
| Appl. No.: | **10/797,933** |
| Filed: | **Mar. 10, 2004** |

Related U.S. Patent Documents

Reissue of:

| | |
|---|---|
| (64) Patent No.: | **6,578,211** |
| Issued: | **Jun. 17, 2003** |
| Appl. No.: | **09/838,041** |
| Filed: | **Apr. 20, 2001** |

Related U.S. Application Data

(63) Continuation-in-part of application No. PCT/US00/14086, filed on May 22, 2000.

(51) Int. Cl.
*A47C 1/10* (2006.01)
*A47D 7/04* (2006.01)

(52) U.S. Cl. ..... 5/93.2; 5/655; 5/95; 5/98.1

(58) Field of Classification Search ..... 5/95, 5/93.2, 655

See application file for complete search history.

(56) References Cited

U.S. PATENT DOCUMENTS

| | | | |
|---|---|---|---|
| 874,421 | A | 12/1907 | Nail |
| 2,553,087 | A | 5/1951 | Hanson |
| 2,565,988 | A | 8/1951 | Price |
| 3,659,297 | A | 5/1972 | Schutz |
| 3,833,947 | A | 9/1974 | Sorenson |
| 3,896,513 | A | 7/1975 | Boucher et al. |
| 4,750,223 | A | 6/1988 | D'Arcy et al. |
| 4,811,437 | A | 3/1989 | Dillner |
| 4,967,432 | A | 11/1990 | Kujawski et al. |
| 5,148,561 | A | 9/1992 | Tharalson et al. |
| 5,430,899 | A | 7/1995 | Chisholm |
| 5,845,349 | A | 12/1998 | Tharalson et al. |
| 6,058,528 | A | 5/2000 | Yang |
| 6,192,535 | B1 | 2/2001 | Warner, Jr. et al. |
| 6,202,228 | B1 | 3/2001 | Cox |
| 6,418,575 | B1 | 7/2002 | Cheng |
| 6,430,762 | B1 | 8/2002 | Cheng |
| 6,539,563 | B1 | 4/2003 | Hsia |

OTHER PUBLICATIONS

Century Fold' N Go élan Instruction Manual English PM-1718AA Sep. 2000.
Graco Changing Table Owner's Manual, 2000.
Graco Infant Bassinet Owner's Manual, 2000.

*Primary Examiner*—Matthew C. Graham

(57) ABSTRACT

A co-sleeper convertibly adapted for use as a changing table is described. The invention includes a collapsible rigid frame designed to support an enclosure at a predetermined height. The enclosure has padded walls and is sized and shaped to fit over the rigid frame. The back, first and second side walls of the enclosure are of a first height above a floor of the enclosure while the front wall is of a lower height. The floor of the enclosure is designed to be slightly lower that the top surface of a parental bed. A mattress pad is sized and shaped to fit within the enclosure and is segmented to use as a containing cover for the co-sleeper when the frame is collapsed. A strapping member is provided to hold the co-sleeper to the parental bed. A number of variations of this strapping member are provided. Several styles of support members for enclosure are provided. These include support bars that attach to the rigid frame, a series of hangers that support horizontal bars while hanging from top rails of the frame, and rigid panels and support rods fitted into pockets on the underside of the enclosure. Variants on the invention also include mesh panels for lower portions of the enclosure walls and rigid panels for insertion into pockets in the enclosure walls designed to prevent the formation of unwanted folds in the enclosure walls that could trap a child. The co-sleeper is height adjustable for variations in parental bed height.

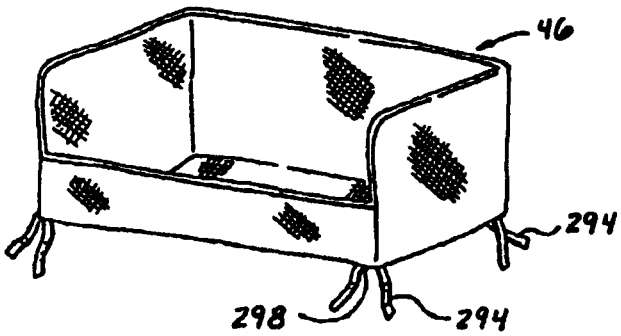

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 5, 6, 8-14, 18, 19 and 25-28 is confirmed.

Claims 1-4, 7, 15-17 and 20-24 and 29-53 are cancelled.

* * * * *